(12) United States Patent
Peng et al.

(10) Patent No.: US 11,115,993 B2
(45) Date of Patent: Sep. 7, 2021

(54) DATA TRANSMISSION METHOD, TERMINAL DEVICE, AND ACCESS NETWORK DEVICE

(71) Applicant: Huawei Technologies Co., Ltd., Shenzhen (CN)

(72) Inventors: Jinlin Peng, Shanghai (CN); Pengpeng Dong, Shanghai (CN); Hao Tang, Shanghai (CN); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 16/579,418

(22) Filed: Sep. 23, 2019

(65) Prior Publication Data
US 2020/0022158 A1    Jan. 16, 2020

Related U.S. Application Data

(63) Continuation of application No. PCT/CN2018/080119, filed on Mar. 23, 2018.

(30) Foreign Application Priority Data

Mar. 24, 2017    (CN) .......................... 201710184656.7

(51) Int. Cl.
*H04W 24/02*    (2009.01)
*H04W 72/12*    (2009.01)
*H04W 28/02*    (2009.01)

(52) U.S. Cl.
CPC ....... *H04W 72/1231* (2013.01); *H04W 24/02* (2013.01); *H04W 28/0236* (2013.01);
(Continued)

(58) Field of Classification Search
CPC ............ H04W 72/1231; H04W 24/02; H04W 28/0236; H04W 28/0284; H04W 72/1268; H04W 72/1289; H04W 28/0278
(Continued)

(56) References Cited

U.S. PATENT DOCUMENTS 10,880,060 B2 *   12/2020   Suzuki .................. H04L 5/0048
2009/0204867 A1    8/2009   Ho
(Continued)

FOREIGN PATENT DOCUMENTS

CN    1917416 A    2/2007
CN    101345608 A    1/2009
(Continued)

OTHER PUBLICATIONS

"Discussion on HARQ transmission for LAA," 3GPP TSG RAN WG1 Ad-hoc Meeting, Paris, France, R1-150993, pp. 1-4, 3rd Generation Partnership Project, Valbonne, France (Mar. 24-26, 2015).
(Continued)

*Primary Examiner* — Danh C Le
(74) *Attorney, Agent, or Firm* — Leydig, Voit & Mayer, Ltd.

(57) ABSTRACT

This application provides a data transmission method, a terminal device, and an access network device. The data transmission method includes: receiving, by a terminal device, information, sent by an access network device, about a carrier corresponding to the terminal device; determining, based on the information about the carrier, a process quantity corresponding to the carrier; and transmitting data based on the process quantity corresponding to the carrier. In this way, the process quantity can be determined accurately and efficiently, thereby improving data transmission reliability.

17 Claims, 10 Drawing Sheets

(52) U.S. Cl.
CPC ... *H04W 28/0284* (2013.01); *H04W 72/1268* (2013.01); *H04W 72/1289* (2013.01); *H04W 28/0278* (2013.01)

(58) Field of Classification Search
USPC ......... 370/336, 329; 455/550.1, 552.1, 450.1
See application file for complete search history.

(56) References Cited

U.S. PATENT DOCUMENTS

| | | | |
|---|---|---|---|
| 2010/0254327 A1* | 10/2010 | McBeath | H04L 1/1812 |
| | | | 370/329 |
| 2011/0213842 A1* | 9/2011 | Takenouchi | G06Q 30/02 |
| | | | 709/206 |
| 2012/0021755 A1 | 1/2012 | Chin et al. | |
| 2014/0029489 A1 | 1/2014 | Han et al. | |
| 2015/0043394 A1 | 2/2015 | Lin et al. | |
| 2015/0055572 A1* | 2/2015 | Ishikura | H04W 72/048 |
| | | | 370/329 |
| 2015/0365931 A1 | 12/2015 | Ng et al. | |
| 2016/0050667 A1* | 2/2016 | Papasakellariou | H04L 1/1822 |
| | | | 370/329 |
| 2017/0126365 A1* | 5/2017 | Peng | H04L 1/1861 |
| 2018/0013523 A1 | 1/2018 | Seo et al. | |
| 2018/0084448 A1* | 3/2018 | Yang | H04W 16/32 |
| 2018/0241511 A1 | 8/2018 | Harada et al. | |
| 2018/0247782 A1* | 8/2018 | Nakahata | H01H 50/44 |
| 2018/0323934 A1* | 11/2018 | Suzuki | H04W 16/28 |
| 2018/0332512 A1* | 11/2018 | Dalsgaard | H04W 36/00837 |
| 2018/0375627 A1* | 12/2018 | Suzuki | H04B 7/0417 |
| 2018/0376490 A1* | 12/2018 | Lunttila | H04W 72/1268 |
| 2019/0075560 A1* | 3/2019 | Takiguchi | H04W 72/04 |
| 2019/0116489 A1* | 4/2019 | Harada | H04W 72/0413 |
| 2019/0132093 A1* | 5/2019 | Aiba | H04W 72/0446 |
| 2019/0356426 A1* | 11/2019 | He | H04L 1/1822 |
| 2020/0145274 A1* | 5/2020 | Nammi | H04L 27/2614 |
| 2020/0153565 A1* | 5/2020 | Nammi | H04L 5/0094 |
| 2020/0260474 A1* | 8/2020 | Shapin | H04W 72/0446 |
| 2020/0288457 A1* | 9/2020 | Hong | H04L 1/1812 |

FOREIGN PATENT DOCUMENTS

| | | |
|---|---|---|
| CN | 101784076 A | 7/2010 |
| CN | 101946444 A | 1/2011 |
| CN | 102469022 A | 5/2012 |
| CN | 103051435 A | 4/2013 |
| CN | 105162557 A | 12/2015 |
| CN | 105634688 A | 6/2016 |
| EP | 0899972 A2 | 3/1999 |
| EP | 2249506 A2 | 11/2010 |
| EP | 2840732 A1 | 2/2015 |
| IN | 8376/CHENP/2014 A | 7/2016 |
| KR | 101712895 B1 | 3/2017 |
| WO | 2010090420 A2 | 8/2010 |
| WO | 2011127993 A1 | 10/2011 |
| WO | 2013162261 A1 | 10/2013 |
| WO | 2017026433 A1 | 2/2017 |

OTHER PUBLICATIONS

"Remaining RAN1 specification details for TDD-FDD CA." 3GPP TSG RAN WG1 Meeting #76bis, Shenzhen, China, R1-141336, pp. 1-6, 3rd Generation Partnership Project, Valbonne, France (Mar. 31-Apr. 4, 2014).

"DL HARQ in LAA," 3GPP TSG RAN WG1 Meeting #81, Fukuoka, Japan, R1-153025, pp. 1-2, 3rd Generation Partnership Project, Valbonne, France (May 25-29, 2015).

"3GPP TS 36.212 V14.1.1 (Jan. 2017), 3rd Generation Partnership Project; Technical Specification Group Radio Acces Network; Evolved Universal Terrestrial Radio Access (E-UTRA); Multiplexing and channel coding (Release 14)," pp. 1-149, 3rd Generation Partnership Project, Valbonne, France (Jan. 2017).

* cited by examiner

DATA TRANSMISSION METHOD, TERMINAL DEVICE, AND ACCESS NETWORK DEVICE

CROSS-REFERENCE TO RELATED APPLICATIONS

This application is a continuation of International Application No. PCT/CN2018/080119, filed on Mar. 23, 2018, which claims priority to Chinese Patent Application No. 201710184656.7, filed on Mar. 24, 2017. The disclosures of the aforementioned applications are hereby incorporated by reference in their entireties.

TECHNICAL FIELD

This application relates to the field of communication technologies, and in particular, to a data transmission method, a terminal device, and an access network device.

BACKGROUND

In hybrid automatic repeat request (HARQ), data is sent by using a stop-and-wait protocol. In the stop-and-wait protocol, after sending a transport block (TB), a transmit end stops to wait for acknowledgment information. A receive end sends, to the transmit end, a feedback message about the TB, to feed back whether the receive end has received the TB. However, the transmit end stops to wait for a feedback message after each transmission, and this results in a relatively low throughput of a communications system. Therefore, in long term evolution (LTE), data is sent by using a plurality of concurrent processes. When waiting for a feedback message in one process, the transmit end may continue sending data by using another process.

Currently, a fixed process quantity is configured by an access network device for a terminal device. For example, for a frequency division duplex (FDD) mode, an access network device configures eight processes for a terminal device. However, in a fifth generation (5G) network or a new radio (NR) network, a process quantity may be affected by many factors. Therefore, a process quantity configuration manner is neither accurate enough nor efficient enough in the prior art.

SUMMARY

This application provides a data transmission method, a terminal device, and an access network device, to determine a process quantity relatively accurately and efficiently, thereby improving data transmission reliability.

According to a first aspect, this application provides a data transmission method, including: receiving, by a terminal device, information, sent by an access network device, about a carrier of the terminal device; determining, by the terminal device based on the information about the carrier, a process quantity corresponding to the carrier; and transmitting, by the terminal device, data based on the process quantity corresponding to the carrier, where when the data is uplink data, the information about the carrier may include at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, and information about a transmission capability of the terminal device on the carrier; or when the data is downlink data, the information about the carrier may include at least one of the following: a time relationship between downlink scheduling of the terminal device on the carrier and downlink data transmission corresponding to the downlink scheduling, a time relationship between the downlink data transmission of the terminal device on the carrier and sending a feedback message by the terminal device after the terminal device receives the downlink data, time scheduling unit information of the terminal device on the carrier, a subcarrier spacing of the terminal device on the carrier, and information about a transmission capability of the terminal device on the carrier.

In this application, the following are considered: the time relationship between the uplink scheduling of the terminal device on the carrier and the uplink data transmission, the time relationship between the downlink scheduling of the terminal device on the carrier and the downlink data transmission, the time relationship between the downlink data transmission of the terminal device on the carrier and sending a feedback message by the terminal device, the time scheduling unit information of the terminal device on the carrier; the subcarrier spacing of the terminal device on the carrier; a type of slot aggregation of the terminal device on the carrier, the information about the transmission capability of the terminal device on the carrier, a type of a to-be-processed service of the terminal device on the carrier, and the like, so as to determine the process quantity corresponding to the carrier. The process quantity can be determined relatively accurately and efficiently by using the method, thereby improving data transmission reliability.

Optionally, when the information about the carrier includes the time relationship between the uplink scheduling on the carrier and the uplink data transmission corresponding to the uplink scheduling, the determining, by the terminal device based on the information about the carrier, a process quantity corresponding to the carrier includes: determining, by the terminal device, a time interval between the uplink scheduling and the uplink data transmission; and determining, by the terminal device, that the sum of the time interval and a constant M is the process quantity corresponding to the carrier, where M is an integer greater than or equal to 0.

Optionally, when the information about the carrier includes the time relationship between the uplink scheduling on the carrier and the uplink data transmission corresponding to the uplink scheduling, the determining, by the terminal device based on the information about the carrier, a process quantity corresponding to the carrier includes: determining, by the terminal device, a default process quantity corresponding to the carrier, and determining a first time interval between uplink scheduling corresponding to the default process quantity and uplink data transmission corresponding to the default process quantity; determining, by the terminal device, a mapping relationship between a time interval and a process quantity based on the default process quantity and the first time interval; determining, by the terminal device, a second time interval between the uplink scheduling on the carrier and the uplink data transmission corresponding to the uplink scheduling; and determining, by the terminal device based on the mapping relationship and the second time interval, the process quantity corresponding to the carrier.

In the foregoing two optional manners, the time relationship between the uplink scheduling of the terminal device on the carrier and the uplink data transmission is considered, to determine the process quantity corresponding to the carrier.

The process quantity can be determined relatively accurately and efficiently by using the method, thereby improving data transmission reliability.

Optionally, when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, the determining, by the terminal device based on the information about the carrier, a process quantity corresponding to the carrier includes: determining, by the terminal device, a third time interval between the downlink scheduling on the carrier and the downlink data transmission corresponding to the downlink scheduling, and a fourth time interval between the downlink data transmission and sending a feedback message by the terminal device after the terminal device receives the downlink data; determining, by the terminal device, the time sum of the third time interval and the fourth time interval; and determining, by the terminal device, that the sum of the time sum and a constant N is the process quantity corresponding to the carrier, where N is an integer greater than or equal to 0.

Optionally, when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, the determining, by the terminal device based on the information about the carrier, a process quantity corresponding to the carrier includes: determining, by the terminal device, a third time interval between the downlink scheduling on the carrier and the downlink data transmission corresponding to the downlink scheduling, and a fourth time interval between the downlink data transmission and sending a feedback message by the terminal device after the terminal device receives the downlink data; calculating, by the terminal device, the sum of the third time interval and the fourth time interval, to obtain a first summation result; determining, by the terminal device, a default process quantity corresponding to the carrier, and determining a fifth time interval between downlink scheduling corresponding to the default process quantity and downlink data transmission corresponding to the default process quantity, and a sixth time interval between the downlink data transmission corresponding to the default process quantity and sending a feedback message by the terminal device; calculating, by the terminal device, the sum of the fifth time interval and the sixth time interval, to obtain a second summation result; determining, by the terminal device, a mapping relationship between a summation result and a process quantity based on the default process quantity and the second summation result; and determining, by the terminal device based on the mapping relationship and the first summation result, the process quantity corresponding to the carrier.

In the foregoing two optional manners, the time relationship between the downlink scheduling on the carrier and the downlink data transmission corresponding to the downlink scheduling and the time relationship between the downlink data transmission and sending a feedback message by the terminal device after the terminal device receives the downlink data are considered, to determine the process quantity corresponding to the carrier. The process quantity can be determined relatively accurately and efficiently by using the method, thereby improving data transmission reliability.

Optionally, when the information about the carrier includes the time scheduling unit information on the carrier and/or the subcarrier spacing on the carrier, the determining, by the terminal device based on the information about the carrier, a process quantity corresponding to the carrier includes: determining, by the terminal device based on a correspondence between time scheduling unit information and/or a subcarrier spacing and a process quantity, the process quantity corresponding to the carrier.

In this application, the time scheduling unit information on the carrier and/or the subcarrier spacing on the carrier are/is considered, to determine the process quantity corresponding to the carrier. The process quantity can be determined relatively accurately and efficiently by using the method, thereby improving data transmission reliability.

Optionally, the information about the carrier is carried in any one of the following signaling: higher layer signaling, physical layer signaling, broadcast signaling, and system information block SIB signaling.

Optionally, the method further includes: determining, by the terminal device, a buffer size corresponding to each transport block TB, based on the process quantity corresponding to the carrier, a buffer size of the terminal device, and a quantity of carriers included by the terminal device.

Optionally, the method further includes: determining, by the terminal device, a buffer size corresponding to each transport block TB, based on the process quantity corresponding to the carrier, a buffer size of the terminal device, a quantity of carriers included by the terminal device, and at least one of the following corresponding to the carrier: a quantity of resource blocks RBs, a load, and a bandwidth.

According to this application, the buffer size corresponding to the TB can be effectively calculated in the foregoing two optional manners.

The following describes a data transmission method performed by an access network device. An implementation principle and a technical effect of the data transmission method performed by the access network device are similar to those of the data transmission method performed by the terminal device, and details are not described herein again.

According to a second aspect, this application provides a data transmission method, including: determining, by an access network device, information about a carrier corresponding to a terminal device; determining, by the access network device based on the information about the carrier, a process quantity corresponding to the carrier; and sending, by the access network device to the terminal device, the process quantity corresponding to the carrier, so that the terminal device transmits data based on the process quantity corresponding to the carrier, where when the data is uplink data, the information about the carrier may include at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, and information about a transmission capability of the terminal device on the carrier; or when the data is downlink data, the information about the carrier may include at least one of the following: a time relationship between downlink scheduling of the terminal device on the carrier and downlink data transmission corresponding to the downlink scheduling, a time relationship between the downlink data transmission of the terminal device on the carrier and sending a feedback message by the terminal device after the terminal device receives the downlink data, time scheduling unit information of the terminal device on the carrier, a subcarrier spacing of the terminal device on the carrier, and information about a transmission capability of the terminal device on the carrier.

Optionally, when the information about the carrier includes the time relationship between the uplink scheduling on the carrier and the uplink data transmission corresponding to the uplink scheduling, the determining, by the access network device based on the information about the carrier, a process quantity corresponding to the carrier includes: determining, by the access network device, a time interval between the uplink scheduling and the uplink data transmission; and determining, by the access network device, that the sum of the time interval and a constant M is the process quantity corresponding to the carrier, where M is an integer greater than or equal to 0.

Optionally, when the information about the carrier includes the time relationship between the uplink scheduling on the carrier and the uplink data transmission corresponding to the uplink scheduling, the determining, by the access network device based on the information about the carrier, a process quantity corresponding to the carrier includes: determining, by the access network device, a default process quantity corresponding to the carrier, and determining a first time interval between uplink scheduling corresponding to the default process quantity and uplink data transmission corresponding to the default process quantity; determining, by the access network device, a mapping relationship between a time interval and a process quantity based on the default process quantity and the first time interval; determining, by the access network device, a second time interval between the uplink scheduling on the carrier and the uplink data transmission corresponding to the uplink scheduling; and determining, by the access network device based on the mapping relationship and the second time interval, the process quantity corresponding to the carrier.

Optionally, when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, the determining, by the access network device based on the information about the carrier, a process quantity corresponding to the carrier includes: determining, by the access network device, a third time interval between the downlink scheduling on the carrier and the downlink data transmission corresponding to the downlink scheduling, and a fourth time interval between the downlink data transmission and sending a feedback message by the terminal device after the terminal device receives the downlink data; determining, by the access network device, the time sum of the third time interval and the fourth time interval; and determining, by the access network device, that the sum of the time sum and a constant N is the process quantity corresponding to the carrier, where N is an integer greater than or equal to 0.

Optionally, when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, the determining, by the access network device based on the information about the carrier, a process quantity corresponding to the carrier includes: determining, by the access network device, a third time interval between the downlink scheduling on the carrier and the downlink data transmission corresponding to the downlink scheduling, and a fourth time interval between the downlink data transmission and sending a feedback message by the terminal device after the terminal device receives the downlink data; calculating, by the access network device, the sum of the third time interval and the fourth time interval, to obtain a first summation result; determining, by the access network device, a default process quantity corresponding to the carrier, and determining a fifth time interval between downlink scheduling corresponding to the default process quantity and downlink data transmission corresponding to the default process quantity, and a sixth time interval between the downlink data transmission corresponding to the default process quantity and sending a feedback message by the terminal device; calculating, by the access network device, the sum of the fifth time interval and the sixth time interval, to obtain a second summation result; determining, by the access network device, a mapping relationship between a summation result and a process quantity based on the default process quantity and the second summation result; and determining, by the access network device based on the mapping relationship and the first summation result, the process quantity corresponding to the carrier.

Optionally, when the information about the carrier includes the time scheduling unit information on the carrier and/or the subcarrier spacing on the carrier, the determining, by the access network device based on the information about the carrier, a process quantity corresponding to the carrier includes: determining, by the access network device based on a correspondence between time scheduling unit information and/or a subcarrier spacing and a process quantity, the process quantity corresponding to the carrier.

The following describes a terminal device. The terminal device can be configured to perform the first aspect and the optional manners corresponding to the first aspect. An implementation principle and a technical effect of the terminal device are similar to those of the first aspect and the optional manners corresponding to the first aspect, and details are not described herein again.

According to a third aspect, this application provides a terminal device, including: a receiving module, configured to receive information, sent by an access network device, about a carrier of the terminal device; a determining module, configured to determine, based on the information about the carrier, a process quantity corresponding to the carrier; and a transmission module, configured to transmit data based on the process quantity corresponding to the carrier, where when the data is uplink data, the information about the carrier may include at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, and information about a transmission capability of the terminal device on the carrier; or when the data is downlink data, the information about the carrier may include at least one of the following: a time relationship between downlink scheduling of the terminal device on the carrier and downlink data transmission corresponding to the downlink scheduling, a time relationship between the downlink data transmission of the terminal device on the carrier and sending a feedback message by the terminal device after the terminal device receives the downlink data, time scheduling unit information of the terminal device on the carrier, a subcarrier spacing of the terminal device on the carrier, and information about a transmission capability of the terminal device on the carrier.

Optionally, the determining module is specifically configured to: when the information about the carrier includes the time relationship between the uplink scheduling on the carrier and the uplink data transmission corresponding to the uplink scheduling, determine a time interval between the uplink scheduling and the uplink data transmission; and determine that the sum of the time interval and a constant M is the process quantity corresponding to the carrier, where M is an integer greater than or equal to 0.

Optionally, the determining module is specifically configured to: when the information about the carrier includes the time relationship between the uplink scheduling on the carrier and the uplink data transmission corresponding to the uplink scheduling, determine a default process quantity corresponding to the carrier, and determine a first time interval between uplink scheduling corresponding to the default process quantity and uplink data transmission corresponding to the default process quantity; determine a mapping relationship between a time interval and a process quantity based on the default process quantity and the first time interval; determine a second time interval between the uplink scheduling on the carrier and the uplink data transmission corresponding to the uplink scheduling; and determine, based on the mapping relationship and the second time interval, the process quantity corresponding to the carrier.

Optionally, the determining module is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data; determine the time sum of the third time interval and the fourth time interval; and determine that the sum of the time sum and a constant N is the process quantity corresponding to the carrier, where N is an integer greater than or equal to 0.

Optionally, the determining module is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data; calculate the sum of the third time interval and the fourth time interval, to obtain a first summation result; determine a default process quantity corresponding to the carrier, and determine a fifth time interval between downlink scheduling corresponding to the default process quantity and downlink data transmission corresponding to the default process quantity, and a sixth time interval between the downlink data transmission corresponding to the default process quantity and sending a feedback message by the terminal device; calculate the sum of the fifth time interval and the sixth time interval, to obtain a second summation result; determine a mapping relationship between a summation result and a process quantity based on the default process quantity and the second summation result; and determine, based on the mapping relationship and the first summation result, the process quantity corresponding to the carrier.

Optionally, the determining module is specifically configured to: when the information about the carrier includes the time scheduling unit information on the carrier and/or the subcarrier spacing on the carrier, determine, based on a correspondence between the time scheduling unit information and/or the subcarrier spacing and a process quantity, the process quantity corresponding to the carrier.

Optionally, the information about the carrier is carried in any one of the following signaling: higher layer signaling, physical layer signaling, broadcast signaling, and system information block SIB signaling.

Optionally, the determining module is further configured to determine a buffer size corresponding to each transport block TB, based on the process quantity corresponding to the carrier, a buffer size of the terminal device, and a quantity of carriers included by the terminal device.

Optionally, the determining module is further configured to determine a buffer size corresponding to each transport block TB, based on the process quantity corresponding to the carrier, a buffer size of the terminal device, a quantity of carriers included by the terminal device, and at least one of the following corresponding to the carrier: a quantity of resource blocks RBs, a load, and a bandwidth.

The following describes an access network device. The access network device can be configured to perform the second aspect and the optional manners corresponding to the second aspect. An implementation principle and a technical effect of the access network device are similar to those of the second aspect and the optional manners corresponding to the second aspect, and details are not described herein again.

According to a fourth aspect, this application provides an access network device, including: a first determining module, configured to determine information about a carrier corresponding to a terminal device; and a second determining module, configured to determine, based on the information about the carrier, a process quantity corresponding to the carrier; a sending module, configured to send, to the terminal device, the process quantity corresponding to the carrier, so that the terminal device transmits data based on the process quantity corresponding to the carrier, where when the data is uplink data, the information about the carrier may include at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, and information about a transmission capability of the terminal device on the carrier; or when the data is downlink data, the information about the carrier may include at least one of the following: a time relationship between downlink scheduling of the terminal device on the carrier and downlink data transmission corresponding to the downlink scheduling, a time relationship between the downlink data transmission of the terminal device on the carrier and sending a feedback message by the terminal device after the terminal device receives the downlink data, time scheduling unit information of the terminal device on the carrier, a subcarrier spacing of the terminal device on the carrier, and information about a transmission capability of the terminal device on the carrier.

Optionally, the second determining module is specifically configured to: when the information about the carrier includes the time relationship between the uplink scheduling on the carrier and the uplink data transmission corresponding to the uplink scheduling, determine a time interval between the uplink scheduling and the uplink data transmission; and determine that the sum of the time interval and a constant M is the process quantity corresponding to the carrier, where M is an integer greater than or equal to 0.

Optionally, the second determining module is specifically configured to: when the information about the carrier includes the time relationship between the uplink scheduling on the carrier and the uplink data transmission corresponding to the uplink scheduling, determine a default process quantity corresponding to the carrier, and determine a first time interval between uplink scheduling corresponding to the default process quantity and uplink data transmission corresponding to the default process quantity; determine a mapping relationship between a time interval and a process quantity based on the default process quantity and the first time interval; determine a second time interval between the uplink scheduling on the carrier and the uplink data transmission corresponding to the uplink scheduling; and determine, based on the mapping relationship and the second time interval, the process quantity corresponding to the carrier.

Optionally, the second determining module is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data; determine the time sum of the third time interval and the fourth time interval; and determine that the sum of the time sum and a constant N is the process quantity corresponding to the carrier, where N is an integer greater than or equal to 0.

Optionally, the second determining module is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data; calculate the sum of the third time interval and the fourth time interval, to obtain a first summation result; determine a default process quantity corresponding to the carrier, and determine a fifth time interval between downlink scheduling corresponding to the default process quantity and downlink data transmission corresponding to the default process quantity, and a sixth time interval between the downlink data transmission corresponding to the default process quantity and sending a feedback message by the terminal device; calculate the sum of the fifth time interval and the sixth time interval, to obtain a second summation result; determine a mapping relationship between a summation result and a process quantity based on the default process quantity and the second summation result; and determine, based on the mapping relationship and the first summation result, the process quantity corresponding to the carrier.

Optionally, the second determining module is specifically configured to: when the information about the carrier includes the time scheduling unit information on the carrier and/or the subcarrier spacing on the carrier, determine, based on a correspondence between the time scheduling unit information and/or the subcarrier spacing and a process quantity, the process quantity corresponding to the carrier.

According to a fifth aspect, this application provides a computer storage medium, configured to store a computer software instruction used by the foregoing terminal device. The computer storage medium includes a program designed for executing the first aspect.

According to a sixth aspect, an embodiment of this application provides a computer storage medium, configured to store a computer software instruction used by the foregoing access network device. The computer storage medium includes a program designed for executing the second aspect.

According to a seventh aspect, this application provides a computer program product including an instruction. When the computer program is executed by a computer, the instruction enables the computer to perform functions performed by the terminal device in the first aspect and the optional methods.

According to an eighth aspect, this application provides a computer program product including an instruction. When the computer program is executed by a computer, the instruction enables the computer to perform functions performed by the access network device in the second aspect and the optional methods.

According to this application, the data transmission method, the terminal device, and the access network device are provided. The method includes: receiving, by the terminal device, the information, sent by the access network device, about the carrier corresponding to the terminal device; determining, by the terminal device based on the information about the carrier, the process quantity corresponding to the carrier; and transmitting, by the terminal device, the data based on the process quantity corresponding to the carrier. In other words, in this application, the following are considered: the time relationship between the uplink scheduling of the terminal device on the carrier and the uplink data transmission, the time relationship between the downlink scheduling of the terminal device on the carrier and the downlink data transmission, the time relationship between the downlink data transmission of the terminal device on the carrier and sending a feedback message by the terminal device, the time scheduling unit information of the terminal device on the carrier, the subcarrier spacing of the terminal device on the carrier, the type of slot aggregation of the terminal device on the carrier, the information about the transmission capability of the terminal device on the carrier, the type of the to-be-processed service of the terminal device on the carrier, and the like, so as to determine the process quantity corresponding to the carrier. The process quantity can be determined relatively accurately and efficiently by using the method, thereby improving data transmission reliability.

DESCRIPTION OF EMBODIMENTS

An access network device in the embodiments of the present application may be a base transceiver station (BTS) in a global system for mobile communications (GSM) or code division multiple access (CDMA), or may be a NodeB (NB) in wideband code division multiple access (WCDMA), or may be an evolved NodeB (eNodeB, eNB), an access point (AP), or a relay node in an LTE network, or may be a base station or the like in a 5G or NR network. This is not limited herein.

In addition, the terminal device in the embodiments of the present application may be a device that provides a user with voice and/or data connectivity, a handheld device with a radio connection function, or another processing device connected to a radio modem. The terminal device may communicate with at least one core network by using a radio access network (RAN). The terminal device may be a mobile terminal, for example, a mobile phone (or referred to as a "cellular" phone), and a computer that has a mobile terminal. For example, the terminal device may be a portable, pocket-size, handheld, computer built-in or in-vehicle mobile apparatus, which exchanges voice and/or data with the radio access network. The terminal device may also be referred to as a subscriber unit, a subscriber station, a mobile station, a remote station, an access point, a remote terminal, an access terminal, a user terminal, a user agent, or a user equipment (UE). This is not limited herein.

To resolve problems in the prior art, for example, that a process quantity configuration manner is neither accurate enough nor efficient enough because a process quantity may be affected by many factors in a 5G or NR network, this application provides a data transmission method and an apparatus.

A terminal device in this application may start a plurality of processes, to implement data transmission. This application provides a data transmission method. A terminal device or an access network device may determine a process quantity based on information about each carrier corresponding to the terminal device, so that the terminal device can transmit data based on the process quantity.

Figure 1:
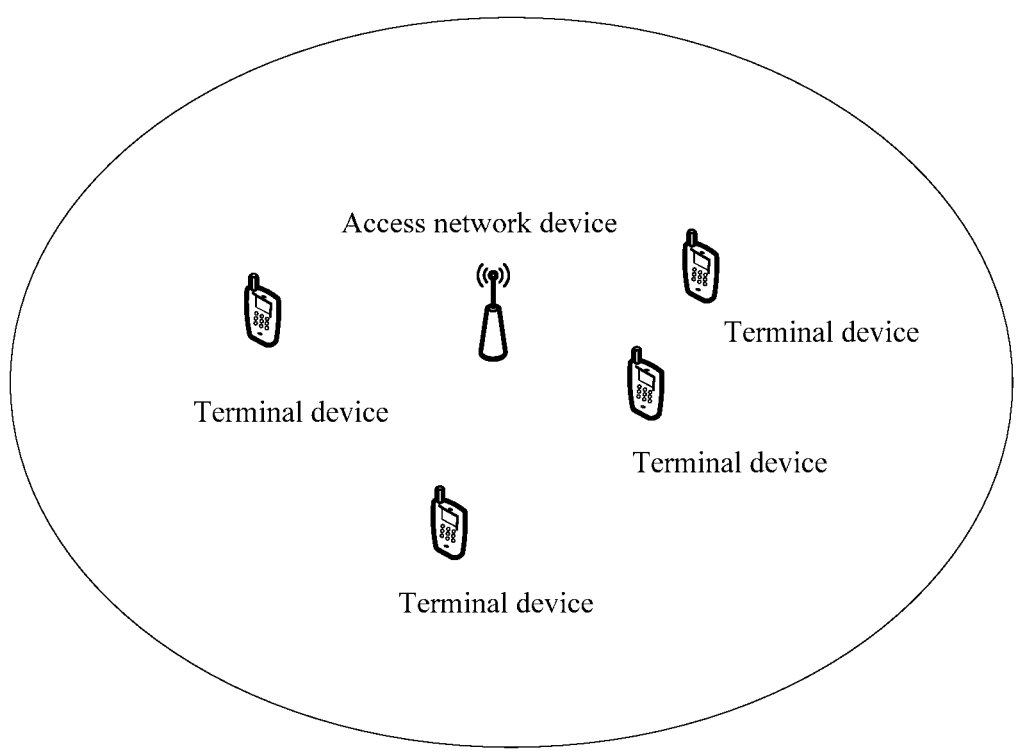
FIG. 1 is a schematic diagram of an application scenario of a data transmission method according to this application.

Specifically, FIG. 1 is a schematic diagram of an application scenario of a data transmission method according to this application. As shown in FIG. 1, in this application, one access network device may transmit data to a plurality of terminal devices. This application mainly describes data transmission between one access network device and one terminal device.

Figure 2:
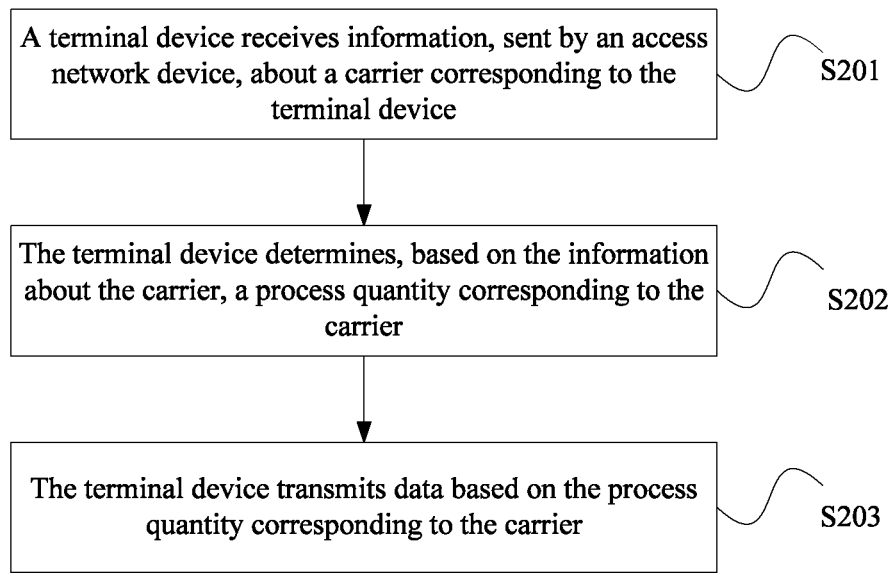
FIG. 2 is a flowchart of a data transmission method according to an embodiment of this application.

Specifically, FIG. 2 is a flowchart of a data transmission method according to an embodiment of this application. As shown in FIG. 2, the method includes the following process.

Step S201: A terminal device receives information, sent by an access network device, about a carrier corresponding to the terminal device.

The carrier corresponding to the terminal device is a transmission carrier of the terminal device. The access network device may simultaneously configure at least one carrier for the terminal device. For each carrier, when data is uplink data, the information about the carrier may include at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, and information about a transmission capability of the terminal device on the carrier.

When data is downlink data, the information about the carrier may include at least one of the following: a time relationship between downlink scheduling of the terminal device on the carrier and downlink data transmission corresponding to the downlink scheduling, a time relationship between the downlink data transmission of the terminal device on the carrier and sending a feedback message by the terminal device after the terminal device receives the downlink data, time scheduling unit information of the terminal device on the carrier, a subcarrier spacing of the terminal device on the carrier, and information about a transmission capability of the terminal device on the carrier.

The time relationship in this application is equivalent to a time interval. For example, when uplink scheduling is performed on a time scheduling unit n or a downlink control indication (DCI) or a control message or a control channel is transmitted on a time scheduling unit n, and corresponding uplink data transmission is performed on a time scheduling unit n+k, a time interval between the time scheduling unit n and the time scheduling unit n+k is k. It should be noted that, the time scheduling unit or a time unit in this application may be one or more slots, or one or more mini-slots, or a transmission time interval (TTI), or one or more time-domain symbols or subframes. Details are not described below again. Definitions of the other two time relationships are similar to this definition, and details are not described again.

The time scheduling unit information on the carrier may be a quantity of slots included in one time scheduling unit, a quantity of mini-slots included in one time scheduling unit, a TTI, a quantity of time-domain symbols included in one time scheduling unit, a quantity of subframes included in one time scheduling unit, absolute duration (for example, one millisecond (ms) or 0.5 ms) included in one time scheduling unit, a quantity of sampling points included in one time scheduling unit, or the like.

The information about the transmission capability of the terminal device on the carrier may include a maximum transmission power of the terminal device on the carrier, a transmission mode of the terminal device on the carrier, and the like. The transmission mode may be specifically, for example, that the terminal device performs data transmission on a carrier together with another terminal device, or that the terminal device performs data transmission on a carrier alone.

In addition, the information about the carrier may include a type of slot aggregation on the carrier and/or a type of a to-be-processed service of the terminal device on the carrier. The type of slot aggregation indicates a quantity of slots that can be aggregated at a time, and indicates a correspondence between a process or a TB and aggregated slots. For example, 10 slots can be aggregated at a time, where the 10 slots are corresponding to one TB.

The type of the to-be-processed service of the terminal device on the carrier may be an ultra-reliable and low latency communications (URLLC) type, an enhanced mobile broadband (eMBB) type, or the like. This is not limited in this embodiment of this application.

Step S202: The terminal device determines, based on the information about the carrier, a process quantity corresponding to the carrier.

When the data sent by the terminal device is downlink data, the process quantity corresponding to the carrier is a quantity of processes for transmitting the downlink data. When the data sent by the terminal device is uplink data, the process quantity corresponding to the carrier is a quantity of processes for transmitting the uplink data.

Example 1: When the data sent by the terminal device is uplink data, and the information about the carrier is the time relationship between the uplink scheduling on the carrier and the uplink data transmission corresponding to the uplink scheduling, the terminal device may determine, based on the time relationship, the process quantity corresponding to the carrier. The access network device may configure a time relationship set for each carrier, or configure a time relationship set for all carriers, where the time relationship set includes at least one time relationship between the uplink scheduling on the carrier and the uplink data transmission. The terminal device may select a time relationship from the set. For example, the terminal device selects a maximum value from the set, and determines, based on the maximum value, the process quantity corresponding to the carrier.

Figure 3:
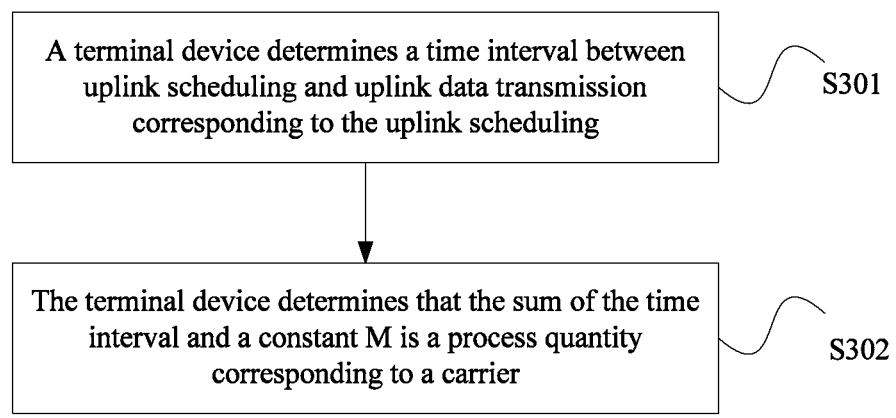
FIG. 3 is a flowchart of a process quantity determining method according to an embodiment of this application.

In an optional manner, FIG. 3 is a flowchart of a process quantity determining method according to an embodiment of this application. As shown in FIG. 3, the method includes the following steps:

Step S301: The terminal device determines a time interval between the uplink scheduling and the uplink data transmission corresponding to the uplink scheduling.

Step S302: The terminal device determines that the sum of the time interval and a constant M is the process quantity corresponding to the carrier.

Specifically, it is assumed that the access network device configures, for a carrier, a set of time relationships between uplink scheduling and uplink data transmission corresponding to the uplink scheduling, and that the set is {2, 4}. Each element in the set represents a possible time interval between the uplink scheduling on the carrier and the uplink data transmission. The terminal device selects a maximum value 4 from the set. The constant M is optionally duration for processing the uplink data by the access network device or another value. Assuming that M is 4, the sum of M and the maximum value 4 is 8. The terminal device determines that the process quantity corresponding to the carrier is 8.

Step S302 may be alternatively determining, by the terminal device, that a product of a value in the set and a constant M is the process quantity corresponding to the carrier.

Figure 4:
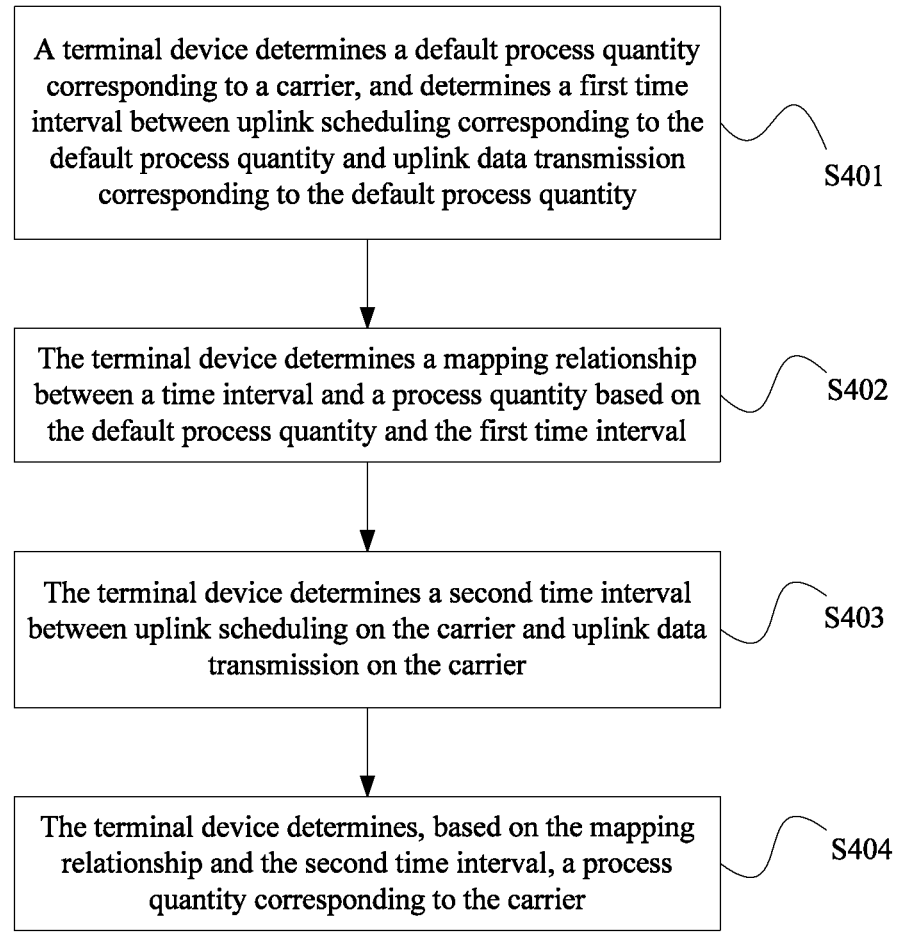
FIG. 4 is a flowchart of a process quantity determining method according to another embodiment of this application.

In another optional manner, FIG. 4 is a flowchart of a process quantity determining method according to another embodiment of this application. As shown in FIG. 4, the method includes the following steps:

Step S401: The terminal device determines a default process quantity corresponding to the carrier, and determines a first time interval between uplink scheduling corresponding to the default process quantity and uplink data transmission corresponding to the default process quantity.

Step S402: The terminal device determines a mapping relationship between a time interval and a process quantity based on the default process quantity and the first time interval.

Step S403: The terminal device determines a second time interval between the uplink scheduling on the carrier and the uplink data transmission on the carrier.

Step S404: The terminal device determines, based on the mapping relationship and the second time interval, the process quantity corresponding to the carrier.

Specifically, the uplink scheduling corresponding to the default process quantity and the uplink data transmission corresponding to the default process quantity indicate that the default process quantity is corresponding to the uplink scheduling, and that the uplink scheduling is corresponding to the uplink data transmission. In addition, in this application, the uplink scheduling on the carrier and the uplink data transmission on the carrier indicate that the uplink data transmission is uplink data transmission corresponding to the uplink scheduling on the carrier. Assuming that the terminal device determines that a default process corresponding to a carrier is p0, a first time interval corresponding to the default process is t0, and that a second time interval is t1, a process quantity p1 corresponding to the carrier satisfies p1=p0+f(t1−t0). The second time interval is also a value selected by the terminal device from the set of time relationships. The formula is the mapping relationship between the time interval and the process quantity. For example, if a default process corresponding to a carrier is 10, f(t1−t0)=t1−t0, t1=16, and t0=10, p1=10+16−10=16. The mapping relationship between the time interval and the process quantity is determined according to a rule between the time interval and the process quantity. Therefore, the mapping relationship between the time interval and the process quantity is not limited in this application.

Example 2: When the information about the carrier includes the time scheduling unit information configured on the carrier, the terminal device may determine, based on the time scheduling unit information on the carrier, the process quantity corresponding to the carrier. Specifically, after obtaining the time scheduling unit information configured on the carrier, the terminal device determines, based on a correspondence between time scheduling unit information and a process quantity, the process quantity corresponding to the carrier. It is assumed that the time scheduling unit information is a quantity of time-domain symbols included in a time scheduling unit. Optionally, refer to Table 1 for a correspondence between a quantity of time-domain symbols included in a time scheduling unit and a process quantity. Optionally, the process quantity of the carrier is inversely proportional to the quantity of time-domain symbols included in one time scheduling unit. Refer to Table 1, which is an example rather than a limitation.

TABLE 1

| Quantity of time-domain symbols included in a time scheduling unit | Process quantity |
|---|---|
| 2 | 16 |
| 7 | 8 |
| 14 | 4 |

Optionally, the correspondence, shown in Table 1, between a quantity of time-domain symbols and a process quantity may be pre-determined in a protocol, or configured by using radio resource control (RRC), or configured by using a master information block (MIB) message, a system information block (System Information Block, SIB), and media access control (MAC) control element (MAC CE) signaling.

Example 3: When the information about the carrier includes the subcarrier spacing configured on the carrier, the terminal device may determine, based on the subcarrier spacing, the process quantity corresponding to the carrier. Specifically, after obtaining the subcarrier spacing configured on the carrier, the terminal device determines, based on a correspondence between a subcarrier spacing and a process quantity, the process quantity corresponding to the carrier. Optionally, the process quantity is directly proportional to the subcarrier spacing. Refer to Table 2, which is an example rather than a limitation.

TABLE 2

| Subcarrier spacing on a carrier (kilohertz (KHz)) | Process quantity |
|---|---|
| 15 | 4 |
| 30 | 8 |
| 60 | 16 |

Optionally, the correspondence, shown in Table 2, between a subcarrier spacing on a carrier and a process quantity may be pre-determined in a protocol, or configured by using RRC, or configured by using a MIB message, a SIB message, and MAC CE signaling.

Figure 5:
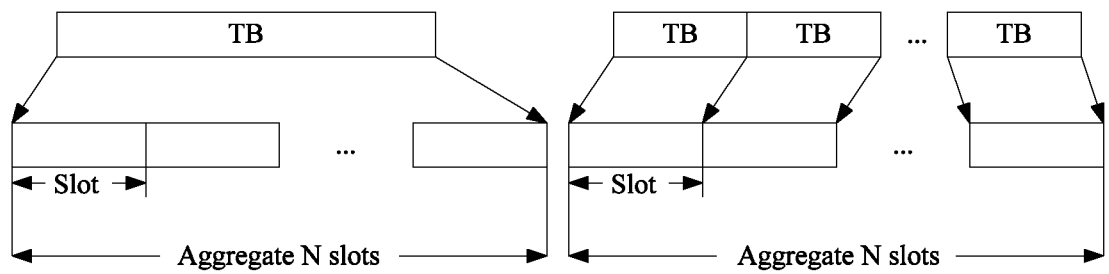
FIG. 5 is a schematic diagram of slot aggregation according to an embodiment of this application.

Example 4: When the information about the carrier includes the type of slot aggregation on the carrier, the terminal device may determine, based on the type of slot aggregation, the process quantity corresponding to the carrier. FIG. 5 is a schematic diagram of slot aggregation according to an embodiment of this application. As shown in FIG. 5, a slot aggregation manner on the left is: The access network device schedules N slots on a carrier by using one downlink control indication (DCI), where N is a positive integer greater than 1. These slots are corresponding to one process or one TB. On this basis, the terminal device determines that the process quantity corresponding to the carrier is 8. A slot aggregation manner on the right is: The access network device schedules N slots on a carrier by using one DCI, where the slots are in a one-to-one correspondence with processes, or the slots are in a one-to-one correspondence with TBs. On this basis, the terminal device determines that the process quantity corresponding to the carrier is 16. A correspondence between a type of slot aggregation on a carrier and a process quantity corresponding to the carrier is not unique. This is not limited in this application.

Example 5: When the information about the carrier is the information about the transmission capability of the terminal device on the carrier, the terminal device may determine, based on the information about the transmission capability of the terminal device on the carrier, the process quantity corresponding to the carrier. Assuming that information about a transmission capability of the terminal device on a carrier is a maximum transmission power of the terminal device on the carrier, the maximum transmission power is directly proportional to a process quantity corresponding to the carrier. It is assumed that information about a transmission capability of the terminal device on a carrier is a transmission mode of the terminal device on the carrier. The transmission mode may be specifically, for example, that the terminal device performs data transmission on a carrier together with another terminal device, or that the terminal device performs data transmission on a carrier alone. When the terminal device performs data transmission on a carrier together with another terminal device, a process quantity determined by the terminal device is greater than a process quantity that is determined by the terminal device when the terminal device performs data transmission on a carrier alone.

Example 6: When the information about the carrier includes the type of the to-be-processed service of the terminal device on the carrier, the terminal device may determine, based on the type of the to-be-processed service, the process quantity corresponding to the carrier. For example, Table 3 shows a correspondence between a type of a to-be-processed service of the terminal device on a carrier and a process quantity corresponding to the carrier.

TABLE 3

| Type of a to-be-processed service on a carrier | Process quantity corresponding to the carrier |
|---|---|
| URLLC service | 1 |
| eMBB service | 8 |

Example 7: When the data sent by the terminal device is downlink data, and the information about the carrier includes the time relationship between the downlink scheduling on the carrier and the downlink data transmission corresponding to the downlink scheduling, the terminal device may determine, based on the time relationship, the process quantity corresponding to the carrier. The access network device may configure a time relationship set for the carrier, where the time relationship set includes at least one time relationship between the downlink scheduling on the carrier and the downlink data transmission. The terminal device may select a time relationship, such as a maximum value, from the time relationship set, to determine the process quantity corresponding to the carrier.

It is assumed that the access network device configures, for a carrier, a set of time relationships between downlink scheduling and downlink data transmission. It is assumed that the set is {2, 4}. Each element in the set represents a possible time interval between the downlink scheduling on the carrier and the downlink data transmission. The terminal device selects a maximum value 4 from the set. Assuming that N is 4, the sum of 4 and the maximum value 4 is 8. The terminal device determines that the process quantity corresponding to the carrier is 8.

The example may be alternatively determining, by the terminal device, that a product of a value in the set of time relationships and a constant N is the process quantity corresponding to the carrier.

Example 8: When the data sent by the terminal device is downlink data, and the information about the carrier includes the time relationship between the downlink data transmission on the carrier and sending a feedback message by the terminal device after the terminal device receives the downlink data, the terminal device may determine, based on the time relationship, the process quantity corresponding to the carrier. The access network device may configure a time relationship set for the carrier, where the time relationship set includes at least one time relationship between the downlink data transmission on the carrier and sending a feedback message of the downlink data by the terminal device. The terminal device may select a time relationship, such as a maximum value, from the time relationship set, to determine the process quantity corresponding to the carrier.

It is assumed that the access network device configures, for a carrier, a set of time relationships between downlink data transmission and sending a feedback message of the data by the terminal device. It is assumed that the set is {2, 4}. Each element in the set represents a possible time interval between the downlink data transmission and sending a feedback message of the data by the terminal device. The terminal device selects a maximum value 4 from the set. The terminal device determines that N is 4, and therefore the sum of N and the maximum value 4 is 8. The terminal device determines that the process quantity corresponding to the carrier is 8.

The example may be alternatively determining, by the terminal device, that a product of a value in the set of time relationships and a constant N is the process quantity corresponding to the carrier.

In this application, a plurality of pieces of information included in the information about the carrier may be further considered comprehensively, to determine the process quantity corresponding to the carrier. A comprehensive consideration method may be: first determining a priority of each of the plurality of pieces of information, where the priority may be pre-configured by the access network device; then determining a first process quantity set corresponding to each carrier by using information with a highest priority, where the first process quantity set includes a plurality of process quantities; then selecting some elements from the first process quantity set by using information with a second highest priority as a second process quantity set; and finally selecting an element from the last but one process quantity set by using information with a lowest priority as the process quantity corresponding to the carrier.

When any process quantity set includes only one element, the terminal device determines that the unique element is the process quantity corresponding to the carrier.

In this application, a plurality of pieces of information included in the information about the carrier may be further considered comprehensively, to determine the process quantity corresponding to the carrier. The following several methods may be included.

Example 9: When the information about the carrier includes the time scheduling unit information configured by the terminal device on the carrier and the subcarrier spacing configured by the terminal device on the carrier, the terminal device may determine, based on the time scheduling unit information and the subcarrier spacing on the carrier, the process quantity corresponding to the carrier. Specifically, after obtaining the time scheduling unit information on the carrier and the subcarrier spacing on the carrier, the terminal device determines, based on a correspondence between time scheduling unit information, a subcarrier spacing on the carrier, and a process quantity, the process quantity corresponding to the carrier. Optionally, a quantity of time-domain symbols included in the time scheduling unit information on the carrier is inversely proportional to the process quantity corresponding to the carrier, and the subcarrier spacing is directly proportional to the process quantity. Refer to Table 4, which is an example rather than a limitation.

TABLE 4

| Quantity of time-domain symbols included in a time scheduling unit | Subcarrier spacing on a carrier (KHz) | Process quantity |
|---|---|---|
| 2 | 60 | 16 |
| 7 | 30 | 8 |
| 14 | 15 | 4 |

Optionally, the correspondence, shown in Table 4, between a quantity of time-domain symbols, a subcarrier spacing, and a process quantity may be pre-determined in a protocol, or configured by using RRC, or configured by using a MIB message, a SIB message, and MAC CE signaling.

Example 10: When the data sent by the terminal device is uplink data, and the information about the carrier is the time relationship between the downlink scheduling on the carrier and the downlink data transmission corresponding to the downlink scheduling and the time relationship between the downlink data transmission on the carrier and sending a feedback message by the terminal device after the terminal device receives the downlink data, in addition to the foregoing comprehensive consideration method, the process quantity corresponding to the carrier may be further determined in the following manner. There is a set of time relationships between the downlink scheduling on the carrier and the corresponding downlink data transmission, where the set includes a possible time interval between the downlink scheduling on the carrier and the corresponding downlink data transmission. There is also a set of time relationships between the downlink data transmission and sending a feedback message by the terminal device, where the set includes a possible time interval between the downlink data transmission and sending a feedback message by the terminal device. The terminal device may select a maximum value from each of the two sets of time relationships, to determine the process quantity corresponding to the carrier.

Figure 6:
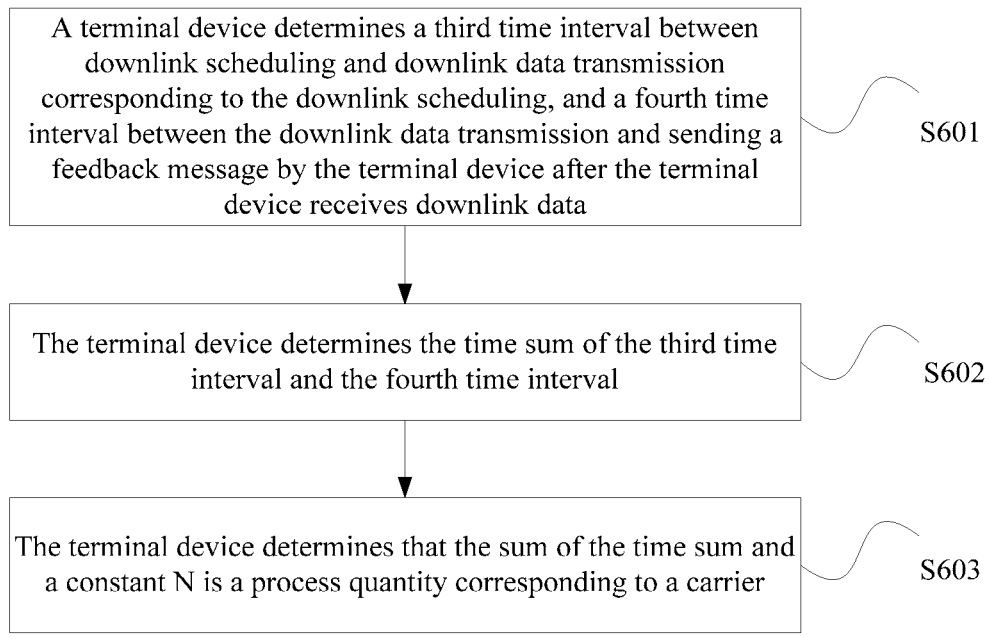
FIG. 6 is a flowchart of a process quantity determining method according to still another embodiment of this application.

In an optional manner, FIG. 6 is a flowchart of a process quantity determining method according to still another embodiment of this application. As shown in FIG. 6, the method includes the following steps:

Step S601: The terminal device determines a third time interval between the downlink scheduling and the downlink data transmission corresponding to the downlink scheduling, and a fourth time interval between the downlink data transmission and sending a feedback message by the terminal device after the terminal device receives the downlink data.

Step S602: The terminal device determines the time sum of the third time interval and the fourth time interval.

Step S603: The terminal device determines that the sum of the time sum and a constant N is the process quantity corresponding to the carrier.

Specifically, it is assumed that the access network device configures, for a carrier, a set of time relationships between downlink scheduling and downlink data transmission corresponding to the downlink scheduling. It is assumed that the set is {2, 4}. Each element in the set represents a possible time interval between the downlink scheduling on the carrier and the downlink data transmission corresponding to the downlink scheduling. The terminal device selects a maximum value 4 from the set. It is assumed that the access network device configures, for a carrier, a set of time relationships between the downlink data transmission and sending a feedback message by the terminal device after the terminal device receives the downlink data. It is assumed that the set is {2, 4}. Each element in the set represents a possible time interval between the downlink data transmission on the carrier and sending a feedback message by the terminal device after the terminal device receives the downlink data. The terminal device selects a maximum value 4 from the set. The terminal device determines that the sum of the two maximum values and the constant N is the process quantity corresponding to the carrier. The constant N is optionally a time length for processing the downlink data by the terminal device. Assuming that N is 4, the terminal device determines that the sum 12 of the two maximum values and the constant N is the process quantity corresponding to the carrier.

Step S603 may be alternatively determining, by the terminal device, that a product of a value in the set of time relationships between the downlink scheduling and the downlink data transmission corresponding to the downlink scheduling, a value in the set of time relationships between the downlink data transmission and sending a feedback message by the terminal device after the terminal device receives the downlink data, and a constant N is the process quantity corresponding to the carrier.

Figure 7:
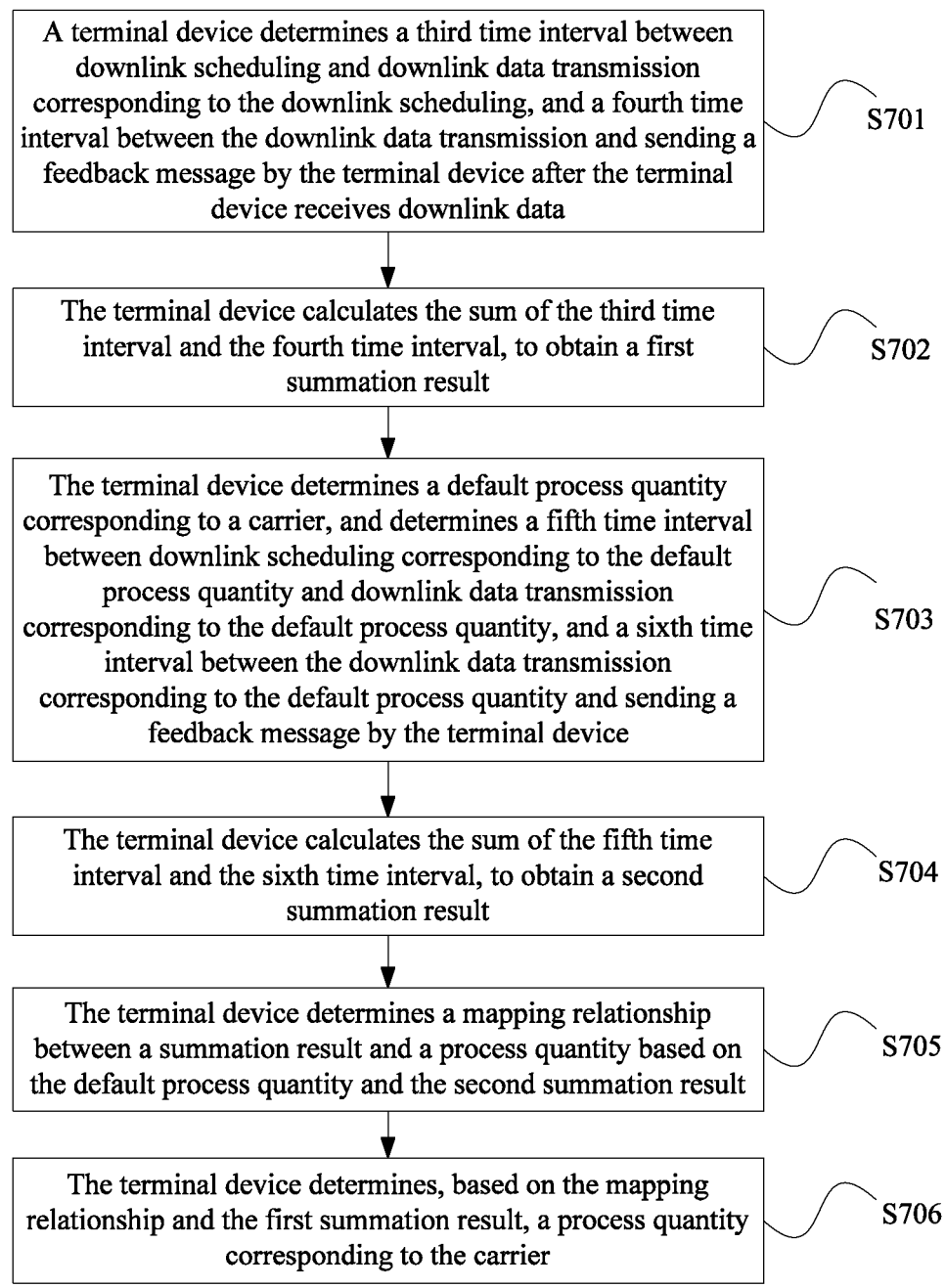
FIG. 7 is a flowchart of a process quantity determining method according to yet another embodiment of this application.

In another optional manner, FIG. 7 is a flowchart of a process quantity determining method according to yet another embodiment of this application. As shown in FIG. 7, the method includes the following steps:

Step S701: The terminal device determines a third time interval between the downlink scheduling and the downlink data transmission corresponding to the downlink scheduling, and a fourth time interval between the downlink data transmission and sending a feedback message by the terminal device after the terminal device receives the downlink data.

Step S702: The terminal device calculates the sum of the third time interval and the fourth time interval, to obtain a first summation result.

Step S703: The terminal device determines a default process quantity corresponding to the carrier, and determines a fifth time interval between downlink scheduling corresponding to the default process quantity and downlink data transmission corresponding to the default process quantity, and a sixth time interval between the downlink data transmission corresponding to the default process quantity and sending a feedback message by the terminal device.

Step S704: The terminal device calculates the sum of the fifth time interval and the sixth time interval, to obtain a second summation result.

Step S705: The terminal device determines a mapping relationship between a summation result and a process quantity based on the default process quantity and the second summation result.

Step S706: The terminal device determines, based on the mapping relationship and the first summation result, the process quantity corresponding to the carrier.

Specifically, there is a correspondence between the downlink scheduling corresponding to the default process quantity, the downlink data transmission, and sending a feedback message by the terminal device. For example, a purpose of the downlink scheduling is to perform the downlink data transmission, and the terminal device sends the feedback message after receiving the downlink data. It is assumed that the terminal device determines that a default process corresponding to a carrier is p0, a current third time interval is t3, and that a fourth time interval is t4; the sum of the third time interval and the fourth time interval is calculated to obtain a first summation result t3+t4=t1. It is assumed that a fifth time interval corresponding to the default process is t5, and that a sixth time interval is t6; the sum of the fifth time interval and the sixth time interval is calculated to obtain a second summation result t5+t6=t2. In this case, a process quantity p1 corresponding to each carrier satisfies p1=p0+f (t2−t1). The formula is the mapping relationship between the summation result and the process quantity. For example, if a default process corresponding to a carrier is 10, f(t2−t1)=t2−t1, t2=t5+t6=20, and t1=t3+t4=10, p1=10+20−10=20. The mapping relationship between a summation result and a process quantity is determined based on a rule between the summation result and the process quantity. Therefore, the mapping relationship between the summation result and the process quantity is not limited.

Example 11: The terminal device may further receive a process quantity set, sent by the access network device, corresponding to the carrier. The terminal device may select a value from the process quantity set based on the information about the carrier as the process quantity corresponding to the carrier.

Optionally, the process quantity set may or may not belong to the foregoing information about each carrier. The process quantity set may be carried in higher layer signaling.

Step S203: The terminal device transmits the data based on the process quantity corresponding to the carrier.

Assuming that the terminal device determines that a process quantity corresponding to a carrier is 10, the terminal device starts 10 processes on the carrier, to send uplink data or downlink data.

According to this application, the data transmission method is provided, including: receiving, by the terminal device, the information, sent by the access network device, about the carrier corresponding to the terminal device; determining, by the terminal device based on the information about the carrier, the process quantity corresponding to the carrier; and transmitting, by the terminal device, the data based on the process quantity corresponding to the carrier. In other words, in this application, the following are considered: the time relationship between the uplink scheduling of the terminal device on the carrier and the uplink data transmission, the time relationship between the downlink scheduling of the terminal device on the carrier and the downlink data transmission, the time relationship between the downlink data transmission of the terminal device on the carrier and sending a feedback message by the terminal device, the time scheduling unit information of the terminal device on the carrier, the subcarrier spacing of the terminal device on the carrier, the type of slot aggregation of the terminal device on the carrier, the information about the transmission capability of the terminal device on the carrier, the type of the to-be-processed service of the terminal device on the carrier, and the like, so as to determine the process quantity corresponding to the carrier. The process quantity can be determined relatively accurately and efficiently by using the method, thereby improving data transmission reliability.

Optionally, the information about the carrier is carried in any one of the following signaling: higher layer signaling, physical layer signaling, broadcast signaling, and system information block (SIB) signaling.

Optionally, the terminal device may determine a buffer size corresponding to each transport block TB, based on the process quantity corresponding to the carrier, a buffer size of the terminal device, and a quantity of carriers included by the terminal device.

When the data sent by the terminal device is uplink data, the carrier is a carrier, configured by the access network device for the terminal device, for sending the uplink data, and the TB is a TB included in the uplink data. Correspondingly, when the data sent by the terminal device is downlink data, the carrier is a carrier, configured by the access network device for the terminal device, for sending the downlink data, and the TB is a TB included in the downlink data.

Specifically, optionally, the buffer size corresponding to each transport block TB may be determined by using the following formula:

$$N_{IR} = \left\lfloor \frac{N_{soft}}{\sum_{i=1}^{K_C} (M_{DL\_HARQ,i} \cdot K_{MIMO,i})} \right\rfloor, \text{ or}$$

$$N_{IR} = \left\lfloor \frac{N_{soft}}{\sum_{i=1}^{K_C} (M_{DL\_HARQ,i} \cdot K_{MIMO})} \right\rfloor, \text{ or}$$

$$N_{IR} = \left\lfloor \frac{N_{soft}}{\sum_{i=1}^{K_C} (\min(M_{DL\_HARQ,i}, M_{limit}) \cdot K_{MIMO})} \right\rfloor.$$

$N_{IR}$ represents a buffer size of each TB on a carrier. $N_{soft}$ represents a buffer size of the terminal device, where the buffer size is determined by a capability of the terminal device. $M_{DL\_HARQ,i}$ represents a process quantity corresponding to the $i^{th}$ carrier. $K_C$ represents a quantity of carriers, configured by the access network device for the terminal device, for sending uplink data or downlink data. $K_{MIMO,i}$ is 1 or 2. When the terminal device uses two-codeword space division multiplexing on the $i^{th}$ carrier, $K_{MIMO,i}$ is 2. When the terminal device does not use two-codeword space division multiplexing on the $i^{th}$ carrier, $K_{MIMO,i}$ is 1. $K_{MIMO}$ is 1 or 2. When the terminal device uses two-codeword space division multiplexing on at least one carrier, $K_{MIMO}$ is 2. When the terminal device uses two-codeword space division multiplexing on none of carriers, $K_{MIMO}$ is 1. $M_{limit}$ is 8. "⌊ ⌋" represents rounding down. "·" represents multiplication.

Optionally, the terminal device determines a buffer size corresponding to each transport block TB, based on the process quantity corresponding to the carrier, a buffer size of the terminal device, a quantity of carriers included by the terminal device, and at least one of the following corresponding to the carrier: a quantity of resource blocks (RBs), a load, and a bandwidth.

When the data sent by the terminal device is uplink data, the carrier is a carrier, configured by the access network device for the terminal device, for sending the uplink data, and the TB is a TB included in the uplink data. Correspondingly, when the data sent by the terminal device is downlink data, the carrier is a carrier, configured by the access network device for the terminal device, for sending the downlink data, and the TB is a TB included in the downlink data.

Specifically, optionally, the buffer size corresponding to each transport block TB may be determined by using the following formula:

$$N_{IR} = \left\lfloor \frac{N_{soft}}{\sum_{i=1}^{K_C} \left( \frac{B_i}{B_{max}} M_{DL\_HARQ,i} \cdot K_{MIMO,i} \right)} \right\rfloor, \text{ or}$$

$$N_{IR} = \left\lfloor \frac{N_{soft}}{\sum_{i=1}^{K_C} \left( \frac{B_i}{B_{max}} M_{DL\_HARQ,i} \cdot K_{MIMO} \right)} \right\rfloor, \text{ or}$$

$$N_{IR} = \left\lfloor \frac{N_{soft}}{\sum_{i=1}^{K_C} \left( \min\left(\frac{B_i}{B_{max}} M_{DL\_HARQ,i}, M_{limit}\right) \cdot K_{MIMO} \right)} \right\rfloor.$$

$N_{IR}$ represents a buffer size of each TB on a carrier. $N_{soft}$ represents a buffer size of the terminal device, where the buffer size is determined by a capability of the terminal device. $M_{DL\_HARQ,i}$ represents a process quantity corresponding to the $i^{th}$ carrier. $K_C$ represents a quantity of carriers, configured by the access network device for the terminal device, for sending uplink data or downlink data. $K_{MIMO,i}$ is 1 or 2. When the terminal device uses two-codeword space division multiplexing on the $i^{th}$ carrier, $K_{MIMO,i}$ is 2. When the terminal device does not use two-codeword space division multiplexing on the $i^{th}$ carrier, $K_{MIMO,i}$ is 1. $K_{MIMO}$ is 1 or 2. When the terminal device uses two-codeword space division multiplexing on at least one carrier, $K_{MIMO}$ is 2. When the terminal device uses two-codeword space division multiplexing on none of carriers, $K_{MIMO}$ is 1. $M_{limit}$ is 8. "⌊ ⌋" represents rounding down. "·" represents multiplication. $B_i$ represents a quantity of RBs on the $i^{th}$ carrier, and $B_{max}$ represents a maximum value of quantities of RBs included by all carriers. For example, the terminal device is corresponding to two carriers. If the first carrier includes 20 RBs, and the second carrier includes 24 RBs, $B_{max}$ is 24. $B_i$ may further represent a load of the $i^{th}$ carrier. Correspondingly, $B_{max}$ represents a maximum value of loads included by all carriers. Alternatively, $B_i$ may further represent a bandwidth of the $i^{th}$ carrier. Correspondingly, $B_{max}$ represents a maximum value of bandwidths included by all carriers.

In conclusion, in this application, the buffer size corresponding to each transport block TB can be accurately determined by using the formulas provided above.

Figure 8:
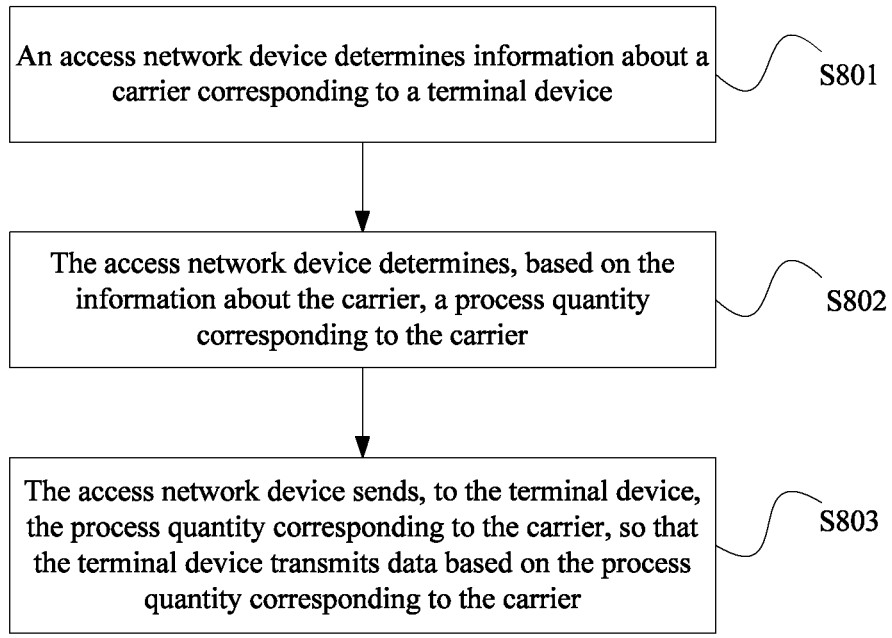
FIG. 8 is a flowchart of a data transmission method according to another embodiment of this application.

FIG. 8 is a flowchart of a data transmission method according to another embodiment of this application. As shown in FIG. 8, the method includes the following process.

Step S801: An access network device determines information about a carrier corresponding to a terminal device.

The carrier corresponding to the terminal device is a transmission carrier of the terminal device. When the data is uplink data, the information about the carrier may include at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, and information about a transmission capability of the terminal device on the carrier.

When the data is downlink data, the information about the carrier may include at least one of the following: a time relationship between downlink scheduling of the terminal device on the carrier and downlink data transmission corresponding to the downlink scheduling, a time relationship between the downlink data transmission of the terminal device on the carrier and sending a feedback message by the terminal device after the terminal device receives the downlink data, time scheduling unit information of the terminal device on the carrier, a subcarrier spacing of the terminal device on the carrier, and information about a transmission capability of the terminal device on the carrier.

The information about the carrier provided in this embodiment of this application is the same as the information about the carrier provided in the foregoing embodiment, and details are not described herein again.

Step S802: The access network device determines, based on the information about the carrier, a process quantity corresponding to the carrier.

Figure 9:
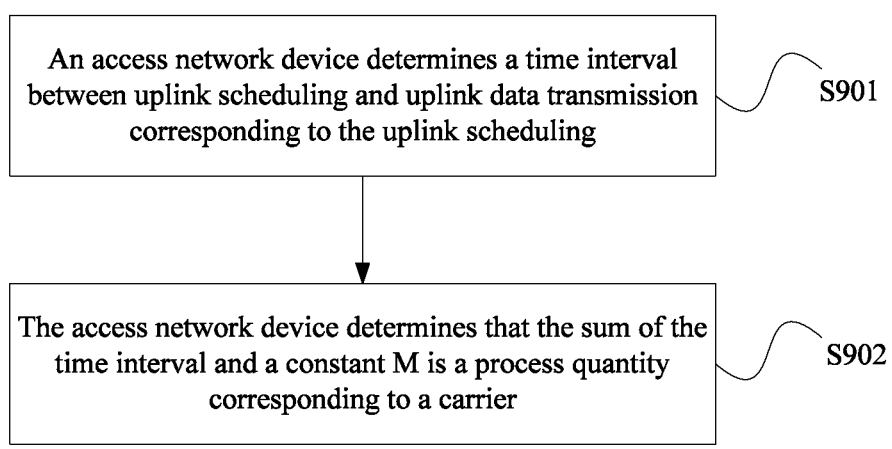
FIG. 9 is a flowchart of a process quantity determining method according to an embodiment of this application.

Example 1: FIG. 9 is a flowchart of a process quantity determining method according to an embodiment of this application. As shown in FIG. 9, the method includes the following steps:

Step S901: The access network device determines a time interval between the uplink scheduling and the uplink data transmission corresponding to the uplink scheduling.

Step S902: The access network device determines that the sum of the time interval and a constant M is the process quantity corresponding to the carrier.

Specifically, it is assumed that the access network device configures, for a carrier, a set of time relationships between uplink scheduling and uplink data transmission corresponding to the uplink scheduling. It is assumed that the set is {2, 4}. Each element in the set represents a possible time interval between the uplink scheduling on the carrier and the uplink data transmission. The access network device selects a maximum value 4 from the set. The constant M is optionally duration for processing the uplink data by the access network device. Assuming that M is 4, the sum of M and the maximum value 4 is 8. The access network device determines that the process quantity corresponding to the carrier is 8.

Step S902 may be alternatively determining, by the access network device, that a product of a value in the set and a constant M is the process quantity corresponding to the carrier.

Figure 10:
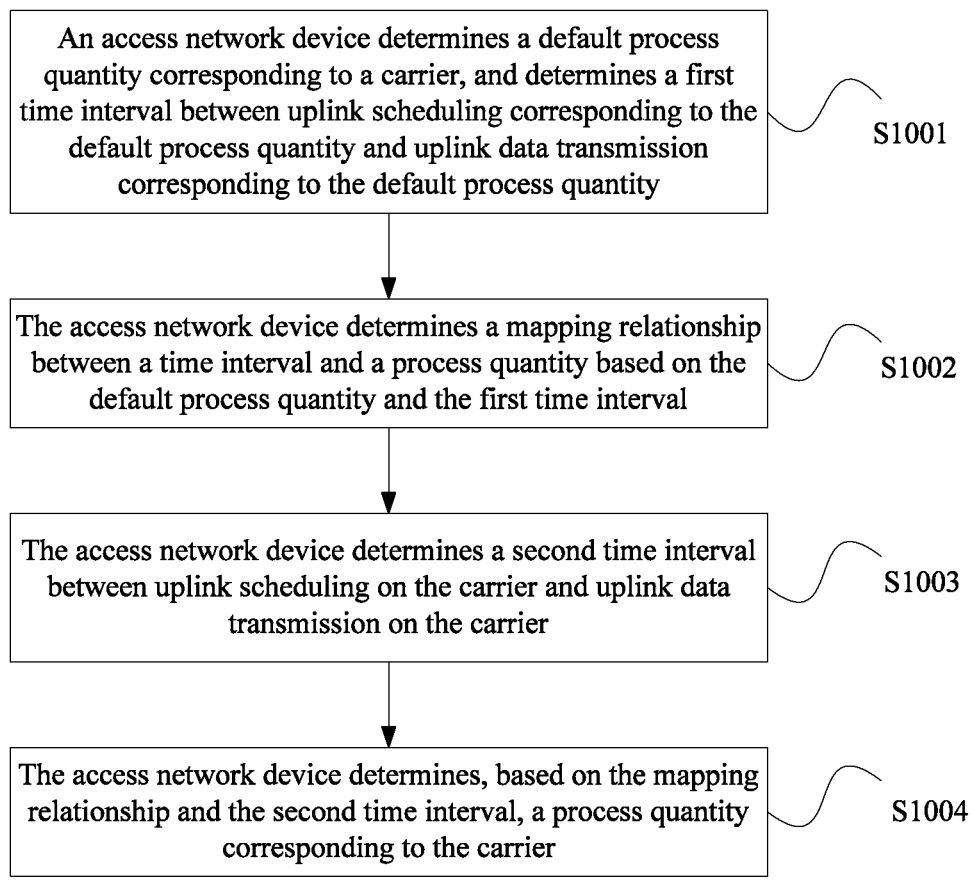
FIG. 10 is a flowchart of a process quantity determining method according to another embodiment of this application.

Example 2: FIG. 10 is a flowchart of a process quantity determining method according to another embodiment of this application. As shown in FIG. 10, the method includes the following steps:

Step S1001: The access network device determines a default process quantity corresponding to the carrier, and determines a first time interval between uplink scheduling corresponding to the default process quantity and uplink data transmission corresponding to the default process quantity.

Step S1002: The access network device determines a mapping relationship between a time interval and a process quantity based on the default process quantity and the first time interval.

Step S1003: The access network device determines a second time interval between the uplink scheduling on the carrier and the uplink data transmission on the carrier.

Step S1004: The access network device determines, based on the mapping relationship and the second time interval, the process quantity corresponding to the carrier.

Specifically, the uplink scheduling corresponding to the default process quantity and the uplink data transmission corresponding to the default process quantity indicate that the default process quantity is corresponding to the uplink scheduling, and that the uplink scheduling is corresponding to the uplink data transmission. In addition, in this application, the uplink scheduling on the carrier and the uplink data transmission on the carrier indicate that the uplink data transmission is uplink data transmission corresponding to the uplink scheduling on the carrier. Assuming that the access network device determines that a default process corresponding to a carrier is p0, a first time interval corresponding to the default process is t0, and that a second time interval is t1, a process quantity p1 corresponding to the carrier satisfies p1=p0+f(t1−t0). The second time interval is also a value selected by the terminal device from the set of time relationships. The formula is the mapping relationship between the time interval and the process quantity. For example, if a default process corresponding to a carrier is 10, f(t1−t0)=t1−t0, t1=16, and t0=10, p1=10+16−10=16. The mapping relationship between the time interval and the process quantity is determined according to a rule between the time interval and the process quantity. Therefore, the mapping relationship between the time interval and the process quantity is not limited in this application.

Figure 11:
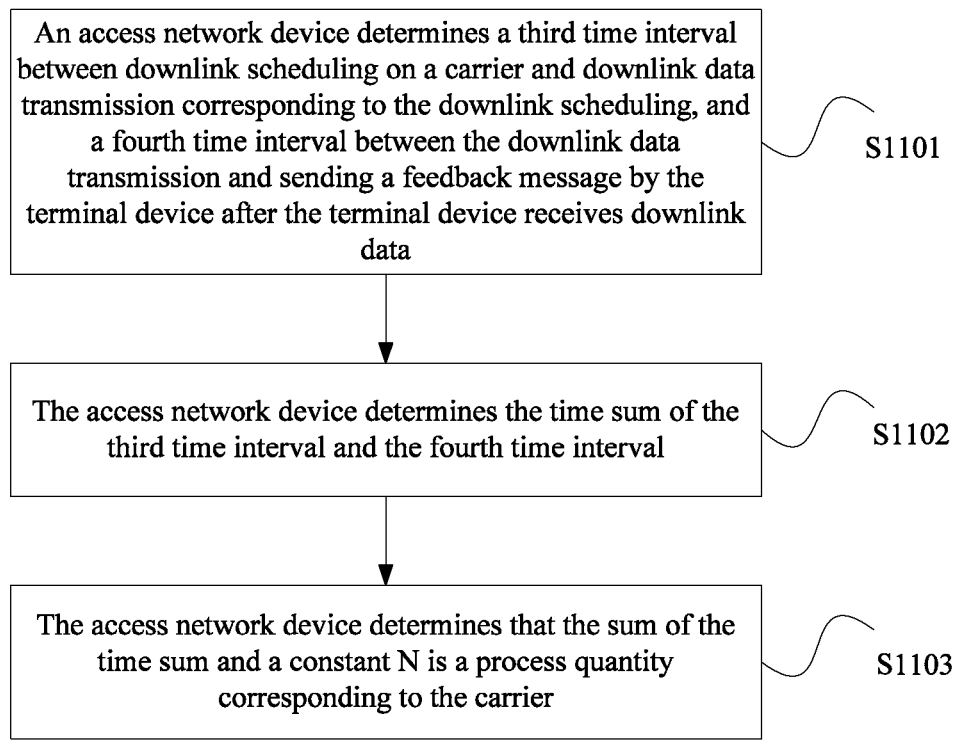
FIG. 11 is a flowchart of a process quantity determining method according to another embodiment of this application.

Example 3: FIG. 11 is a flowchart of a process quantity determining method according to another embodiment of this application. As shown in FIG. 11, the method includes the following steps:

Step S1101: The access network device determines a third time interval between the downlink scheduling on the carrier and the downlink data transmission corresponding to the downlink scheduling, and a fourth time interval between the downlink data transmission and sending a feedback message by the terminal device after the terminal device receives the downlink data.

Step S1102: The access network device determines the time sum of the third time interval and the fourth time interval.

Step S1103: The access network device determines that the sum of the time sum and a constant N is the process quantity corresponding to the carrier.

Specifically, it is assumed that the access network device configures, for a carrier, a set of time relationships between downlink scheduling and downlink data transmission corresponding to the downlink scheduling. It is assumed that the set is {2, 4}. Each element in the set represents a possible time interval between the downlink scheduling on the carrier and the downlink data transmission corresponding to the downlink scheduling. The access network device selects a maximum value 4 from the set. It is assumed that the access network device configures, for a carrier, a set of time relationships between the downlink data transmission and sending a feedback message by the terminal device after the terminal device receives the downlink data. It is assumed that the set is {2, 4}. Each element in the set represents a possible time interval between the downlink data transmission on the carrier and sending a feedback message by the terminal device after the terminal device receives the downlink data. The access network device selects a maximum value 4 from the set. The access network device determines that the sum of the two maximum values and the constant N is the process quantity corresponding to the carrier. The constant N is optionally duration for processing the downlink data by the terminal device. Assuming that N is 4, the access network device determines that the sum 12 of the two maximum values and the constant N is the process quantity corresponding to the carrier.

Step S1103 may be alternatively determining, by the access network device, that a product of a value in the set of time relationships between the downlink scheduling and the downlink data transmission corresponding to the downlink scheduling, a value in the set of time relationships between the downlink data transmission and sending a feedback message by the terminal device after the terminal device receives the downlink data, and a constant N is the process quantity corresponding to the carrier.

Figure 12:
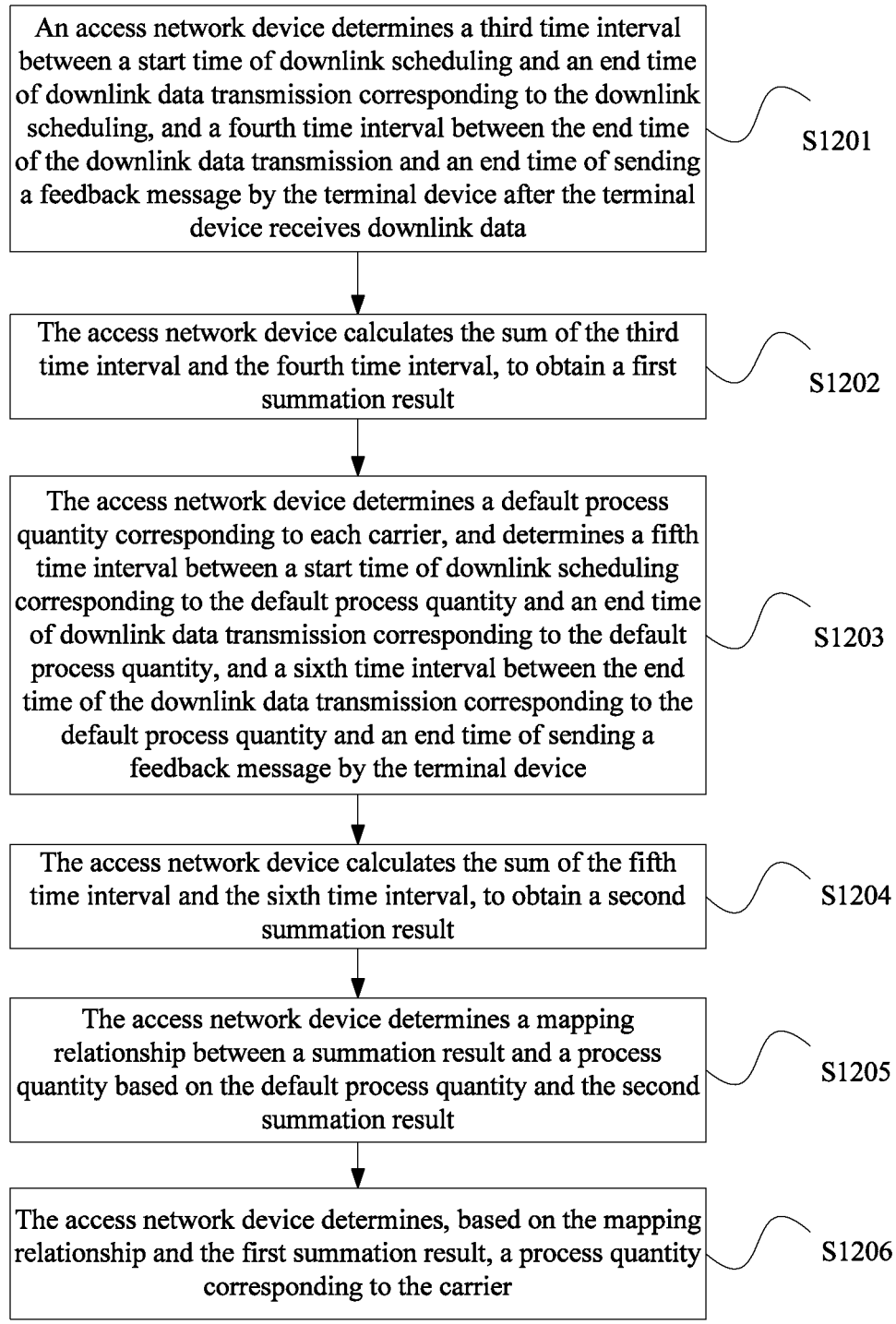
FIG. 12 is a flowchart of a process quantity determining method according to still another embodiment of this application.

Example 4: FIG. 12 is a flowchart of a process quantity determining method according to still another embodiment of this application. As shown in FIG. 12, the method includes the following steps:

Step S1201: The access network device determines a third time interval between the downlink scheduling and the downlink data transmission corresponding to the downlink scheduling, and a fourth time interval between the downlink data transmission and sending a feedback message by the terminal device after the terminal device receives the downlink data.

Step S1202: The access network device calculates the sum of the third time interval and the fourth time interval, to obtain a first summation result.

Step S1203: The access network device determines a default process quantity corresponding to the carrier, and determines a fifth time interval between downlink scheduling corresponding to the default process quantity and downlink data transmission corresponding to the default process quantity, and a sixth time interval between the downlink data transmission corresponding to the default process quantity and sending a feedback message by the terminal device.

Step S1204: The access network device calculates the sum of the fifth time interval and the sixth time interval, to obtain a second summation result.

Step S1205: The access network device determines a mapping relationship between a summation result and a process quantity based on the default process quantity and the second summation result.

Step S1206: The access network device determines, based on the mapping relationship and the first summation result, the process quantity corresponding to the carrier.

Specifically, there is a correspondence between the downlink scheduling corresponding to the default process quantity, the downlink data transmission, and sending a feedback message by the terminal device. For example, a purpose of the downlink scheduling is to perform the downlink data transmission, and the terminal device sends the feedback message after receiving the downlink data. It is assumed that the access network device determines that a default process corresponding to a carrier is p0, a current third time interval is t3, and that a fourth time interval is t4; the sum of the third time interval and the fourth time interval is calculated to obtain a first summation result $t3+t4=t1$. It is assumed that a fifth time interval corresponding to the default process is t5, and that a sixth time interval is t6; the sum of the fifth time interval and the sixth time interval is calculated to obtain a second summation result $t5+t6=t2$. In this case, a process quantity p1 corresponding to each carrier satisfies $p1=p0+f(t2-t1)$. The formula is the mapping relationship between the summation result and the process quantity. For example, if a default process corresponding to a carrier is 10, $f(t2-t1)=t2-t1$, $t2=t5+t6=20$, and $t1=t3+t4=10$, $p1=10+20-10=20$. The mapping relationship between a summation result and a process quantity is determined based on a rule between the summation result and the process quantity. Therefore, the mapping relationship between the summation result and the process quantity is not limited.

Example 5: When the information about the carrier includes the time scheduling unit information of the terminal device on the carrier and/or the subcarrier spacing on the carrier, the determining, by the access network device based on the information about the carrier, a process quantity corresponding to the carrier includes: determining, by the access network device based on a correspondence between time scheduling unit information and/or a subcarrier spacing and a process quantity, the process quantity corresponding to the carrier.

It should be noted that, a method for determining, based on the information about the carrier, the process quantity corresponding to the carrier by the access network device is the same as the method used by the terminal device in step S102, and details are not described herein again.

Step S803: The access network device sends, to the terminal device, the process quantity corresponding to the carrier, so that the terminal device transmits the data based on the process quantity corresponding to the carrier.

According to this application, the data transmission method is provided, including: determining, by the access network device, the information about the carrier corresponding to the terminal device; determining, by the access network device based on the information about the carrier, the process quantity corresponding to the carrier; and sending, by the access network device to the terminal device, the process quantity corresponding to the carrier, so that the terminal device transmits the data based on the process quantity corresponding to the carrier. In other words, in this application, the following are considered: the time relationship between the uplink scheduling on the carrier and the uplink data transmission, the time relationship between the downlink scheduling on the carrier and the downlink data transmission, the time relationship between the downlink data transmission on the carrier and sending a feedback message by the terminal device, the time scheduling unit information on the carrier, the subcarrier spacing on the carrier, a type of slot aggregation on the carrier, the information about the transmission capability of the terminal device on the carrier, a type of a to-be-processed service of the terminal device on the carrier, and the like, so as to determine the process quantity corresponding to the carrier. The process quantity can be determined relatively accurately and efficiently by using the method, thereby improving data transmission reliability.

Optionally, the process quantity corresponding to the carrier is carried in higher layer signaling and/or physical layer signaling.

Specifically, the access network device may add the process quantity corresponding to the carrier to radio resource control (RRC) signaling, media access control (MAC) signaling, or DCI signaling.

The process quantity corresponding to the carrier may be set in the higher layer signaling and/or physical layer signaling in the following several manners:

Manner 1: The access network device may determine a maximum value of the process quantity and a length of the maximum value, and reserve bits of the length in the higher layer signaling and/or physical layer signaling. If an actually configured process quantity is less than the maximum value, an unoccupied bit may be reserved for other data or is filled with no data.

Manner 2: A bit of the process quantity is dynamically determined depending on various application scenario requirements.

Manner 3: A default bit quantity is determined, and an indication range is adjusted depending on various application scenarios. For example, if a length of an actually configured process quantity is greater than the default bit quantity, the indication range can be expanded in another manner.

Manner 4: One or more Timing fields (K0, K1, K2), one or more process number fields, and one or more process quantity fields may be designed together, so that an overall DCI size or a DCI format keeps unchanged. K0 represents the time relationship between the uplink scheduling of the terminal device on the carrier and the uplink data transmission corresponding to the uplink scheduling. K1 represents the time relationship between the downlink scheduling of the terminal device on the carrier and the downlink data transmission corresponding to the downlink scheduling. K2 represents the time relationship between the downlink data transmission of the terminal device on the carrier and sending a feedback message by the terminal device after the terminal device receives the downlink data.

Manner 5: A field in a DCI is used to indicate whether a HARQ process quantity indication bit is changed.

In addition to including the process quantity, the higher layer signaling and/or physical layer signaling may further include a process number field and a time relationship field. The time relationship field includes the time relationship between the uplink scheduling on the carrier and the uplink data transmission, the time relationship between the downlink scheduling on the carrier and the downlink data transmission; and the time relationship between the downlink data transmission on the carrier and sending a feedback message by the terminal device.

Figure 13:
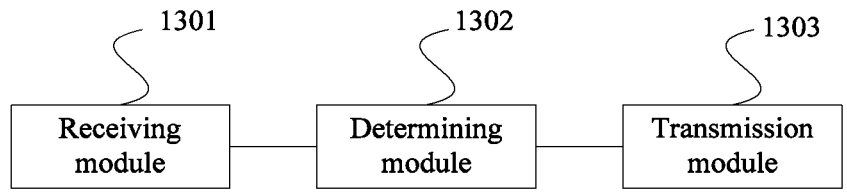
FIG. 13 is a schematic structural diagram of a terminal device according to an embodiment of this application.

FIG. 13 is a schematic structural diagram of a terminal device according to an embodiment of this application. As shown in FIG. 13, the terminal device includes:

a receiving module 1301, configured to receive information, sent by an access network device, about a carrier of the terminal device;

a determining module 1302, configured to determine, based on the information about the carrier, a process quantity corresponding to the carrier; and a transmission module 1303, configured to transmit data based on the process quantity corresponding to the carrier.

When the data is uplink data, the information about the carrier may include at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, and information about a transmission capability of the terminal device on the carrier.

When the data is downlink data, the information about the carrier may include at least one of the following: a time relationship between downlink scheduling of the terminal device on the carrier and downlink data transmission corresponding to the downlink scheduling, a time relationship between the downlink data transmission of the terminal device on the carrier and sending a feedback message by the terminal device after the terminal device receives the downlink data; time scheduling unit information of the terminal device on the carrier, a subcarrier spacing of the terminal device on the carrier, and information about a transmission capability of the terminal device on the carrier.

The terminal device provided in this embodiment of this application can be configured to perform actions or steps performed by the terminal device. An implementation principle and a technical effect of the terminal device are similar to those of the data transmission method performed by the terminal device, and details are not described herein again.

Optionally, the determining module 1302 is specifically configured to: when the information about the carrier includes the time relationship between the uplink scheduling on the carrier and the uplink data transmission corresponding to the uplink scheduling, determine a time interval between the uplink scheduling and the uplink data transmission; and determine that the sum of the time interval and a constant M is the process quantity corresponding to the carrier, where M is an integer greater than or equal to 0.

Optionally, the determining module 1302 is specifically configured to: when the information about the carrier includes the time relationship between the uplink scheduling on the carrier and the uplink data transmission corresponding to the uplink scheduling, determine a default process quantity corresponding to the carrier, and determine a first time interval between uplink scheduling corresponding to the default process quantity and uplink data transmission corresponding to the default process quantity;

determine a mapping relationship between a time interval and a process quantity based on the default process quantity and the first time interval;

determine a second time interval between the uplink scheduling on the carrier and the uplink data transmission corresponding to the uplink scheduling; and determine, based on the mapping relationship and the second time interval, the process quantity corresponding to the carrier.

Optionally, the determining module 1302 is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data;

determine the time sum of the third time interval and the fourth time interval; and determine that the sum of the time sum and a constant N is the process quantity corresponding to the carrier, where N is an integer greater than or equal to 0.

Optionally, the determining module 1302 is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data;

calculate the sum of the third time interval and the fourth time interval, to obtain a first summation result;

determine a default process quantity corresponding to the carrier, and determine a fifth time interval between downlink scheduling corresponding to the default process quantity and downlink data transmission corresponding to the default process quantity, and a sixth time interval between the downlink data transmission corresponding to the default process quantity and sending a feedback message by the terminal device;

calculate the sum of the fifth time interval and the sixth time interval, to obtain a second summation result;

determine a mapping relationship between a summation result and a process quantity based on the default process quantity and the second summation result; and determine, based on the mapping relationship and the first summation result, the process quantity corresponding to the carrier.

Optionally, the determining module 1302 is specifically configured to: when the information about the carrier includes the time scheduling unit information on the carrier and/or the subcarrier spacing on the carrier, determine, based on a correspondence between the time scheduling unit information and/or the subcarrier spacing and a process quantity, the process quantity corresponding to the carrier.

Optionally, the information about the carrier is carried in any one of the following signaling: higher layer signaling, physical layer signaling, broadcast signaling, and system information block SIB signaling.

Optionally, the determining module 1302 is further configured to determine a buffer size corresponding to each transport block TB, based on the process quantity corresponding to the carrier, a buffer size of the terminal device, and a quantity of carriers included by the terminal device.

Optionally, the determining module 1302 is further configured to determine a buffer size corresponding to each transport block TB, based on the process quantity corresponding to the carrier, a buffer size of the terminal device, a quantity of carriers included by the terminal device, and at least one of the following corresponding to the carrier: a quantity of resource blocks RBs, a load, and a bandwidth.

The terminal device provided in this embodiment of this application can be configured to perform actions or steps performed by the terminal device. An implementation principle and a technical effect of the terminal device are similar to those of the data transmission method performed by the terminal device, and details are not described herein again.

Figure 14:
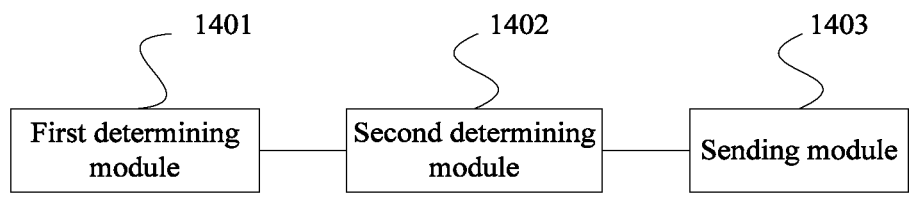
FIG. 14 is a schematic structural diagram of an access network device according to an embodiment of this application.

FIG. 14 is a schematic structural diagram of an access network device according to an embodiment of this application. As shown in FIG. 14, the access network device includes:

a first determining module 1401, configured to determine information about a carrier corresponding to a terminal device;

a second determining module 1402, configured to determine, based on the information about the carrier, a process quantity corresponding to the carrier; and a sending module 1403, configured to send, to the terminal device, the process quantity corresponding to the carrier, so that the terminal device transmits data based on the process quantity corresponding to the carrier.

When the data is uplink data, the information about the carrier may include at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, and information about a transmission capability of the terminal device on the carrier.

When the data is downlink data, the information about the carrier may include at least one of the following: a time relationship between downlink scheduling of the terminal device on the carrier and downlink data transmission corresponding to the downlink scheduling, a time relationship between the downlink data transmission of the terminal device on the carrier and sending a feedback message by the terminal device after the terminal device receives the downlink data, time scheduling unit information of the terminal device on the carrier, a subcarrier spacing of the terminal device on the carrier, and information about a transmission capability of the terminal device on the carrier.

The access network device provided in this embodiment of this application can be configured to perform actions or steps performed by the access network device. An implementation principle and a technical effect of the access network device are similar to those of the data transmission method performed by the access network device, and details are not described herein again.

Optionally, the second determining module 1402 is specifically configured to: when the information about the carrier includes the time relationship between the uplink scheduling on the carrier and the uplink data transmission corresponding to the uplink scheduling, determine a time interval between the uplink scheduling and the uplink data transmission; and determine that the sum of the time interval and a constant M is the process quantity corresponding to the carrier, where M is an integer greater than or equal to 0.

Optionally, the second determining module 1402 is specifically configured to: when the information about the carrier includes the time relationship between the uplink scheduling on the carrier and the uplink data transmission corresponding to the uplink scheduling, determine a default process quantity corresponding to the carrier, and determine a first time interval between uplink scheduling corresponding to the default process quantity and uplink data transmission corresponding to the default process quantity;

determine a mapping relationship between a time interval and a process quantity based on the default process quantity and the first time interval;

determine a second time interval between the uplink scheduling on the carrier and the uplink data transmission corresponding to the uplink scheduling; and determine, based on the mapping relationship and the second time interval, the process quantity corresponding to the carrier.

Optionally, the second determining module 1402 is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data;

determine the time sum of the third time interval and the fourth time interval; and determine that the sum of the time sum and a constant N is the process quantity corresponding to the carrier, where N is an integer greater than or equal to 0.

Optionally, the second determining module 1402 is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data;

calculate the sum of the third time interval and the fourth time interval, to obtain a first summation result;

determine a default process quantity corresponding to the carrier, and determine a fifth time interval between downlink scheduling corresponding to the default process quantity and downlink data transmission corresponding to the default process quantity, and a sixth time interval between the downlink data transmission corresponding to the default process quantity and sending a feedback message by the terminal device;

calculate the sum of the fifth time interval and the sixth time interval, to obtain a second summation result;

determine a mapping relationship between a summation result and a process quantity based on the default process quantity and the second summation result; and determine, based on the mapping relationship and the first summation result, the process quantity corresponding to the carrier.

Optionally, the second determining module 1402 is specifically configured to: when the information about the carrier includes the time scheduling unit information on the carrier and/or the subcarrier spacing on the carrier, determine, based on a correspondence between the time scheduling unit information and/or the subcarrier spacing and a process quantity, the process quantity corresponding to the carrier.

The access network device provided in this embodiment of this application can be configured to perform actions or steps performed by the access network device. An implementation principle and a technical effect of the access network device are similar to those of the data transmission method performed by the access network device, and details are not described herein again.

Figure 15:
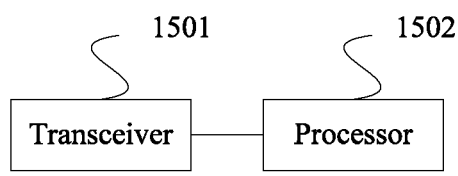
FIG. 15 is a schematic structural diagram of a terminal device according to another embodiment of this application.

FIG. 15 is a schematic structural diagram of a terminal device according to another embodiment of this application. As shown in FIG. 15, the terminal device includes:

a transceiver 1501, configured to receive information, sent by an access network device, about a carrier of the terminal device; and a processor 1502, configured to determine, based on the information about the carrier, a process quantity corresponding to the carrier.

The transceiver 1501 is further configured to transmit data based on the process quantity corresponding to the carrier.

When the data is uplink data, the information about the carrier may include at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, and information about a transmission capability of the terminal device on the carrier.

When the data is downlink data, the information about the carrier may include at least one of the following: a time relationship between downlink scheduling of the terminal device on the carrier and downlink data transmission corresponding to the downlink scheduling, a time relationship between the downlink data transmission of the terminal device on the carrier and sending a feedback message by the terminal device after the terminal device receives the downlink data, time scheduling unit information of the terminal device on the carrier, a subcarrier spacing of the terminal device on the carrier, and information about a transmission capability of the terminal device on the carrier.

The terminal device provided in this embodiment of this application can be configured to perform actions or steps performed by the terminal device. An implementation principle and a technical effect of the terminal device are similar to those of the data transmission method performed by the terminal device, and details are not described herein again.

Optionally, the processor 1502 is specifically configured to: when the information about the carrier includes the time relationship between the uplink scheduling on the carrier and the uplink data transmission corresponding to the uplink scheduling, determine a time interval between the uplink scheduling and the uplink data transmission; and determine that the sum of the time interval and a constant M is the process quantity corresponding to the carrier, where M is an integer greater than or equal to 0.

Optionally, the processor 1502 is specifically configured to: when the information about the carrier includes the time relationship between the uplink scheduling on the carrier and the uplink data transmission corresponding to the uplink scheduling, determine a default process quantity corresponding to the carrier, and determine a first time interval between uplink scheduling corresponding to the default process quantity and uplink data transmission corresponding to the default process quantity;

determine a mapping relationship between a time interval and a process quantity based on the default process quantity and the first time interval;

determine a second time interval between the uplink scheduling on the carrier and the uplink data transmission corresponding to the uplink scheduling; and determine, based on the mapping relationship and the second time interval, the process quantity corresponding to the carrier.

Optionally, the processor 1502 is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data;

determine the time sum of the third time interval and the fourth time interval; and determine that the sum of the time sum and a constant N is the process quantity corresponding to the carrier, where N is an integer greater than or equal to 0.

Optionally, the processor 1502 is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data;

calculate the sum of the third time interval and the fourth time interval, to obtain a first summation result;

determine a default process quantity corresponding to the carrier, and determine a fifth time interval between downlink scheduling corresponding to the default process quantity and downlink data transmission corresponding to the default process quantity, and a sixth time interval between the downlink data transmission corresponding to the default process quantity and sending a feedback message by the terminal device;

calculate the sum of the fifth time interval and the sixth time interval, to obtain a second summation result;

determine a mapping relationship between a summation result and a process quantity based on the default process quantity and the second summation result; and determine, based on the mapping relationship and the first summation result, the process quantity corresponding to the carrier.

Optionally, the processor 1502 is specifically configured to: when the information about the carrier includes the time scheduling unit information on the carrier and/or the subcarrier spacing on the carrier, determine, based on a correspondence between the time scheduling unit information and/or the subcarrier spacing and a process quantity, the process quantity corresponding to the carrier.

Optionally, the information about the carrier is carried in any one of the following signaling: higher layer signaling, physical layer signaling, broadcast signaling, and system information block SIB signaling.

Optionally, the processor 1502 is further configured to determine a buffer size corresponding to each transport block TB, based on the process quantity corresponding to the carrier, a buffer size of the terminal device, and a quantity of carriers included by the terminal device.

Optionally, the processor 1502 is further configured to determine a buffer size corresponding to each transport block TB, based on the process quantity corresponding to the carrier, a buffer size of the terminal device, a quantity of carriers included by the terminal device, and at least one of the following corresponding to the carrier: a quantity of resource blocks RBs, a load, and a bandwidth.

The terminal device provided in this embodiment of this application can be configured to perform actions or steps performed by the terminal device. An implementation principle and a technical effect of the terminal device are similar to those of the data transmission method performed by the terminal device, and details are not described herein again.

Figure 16:
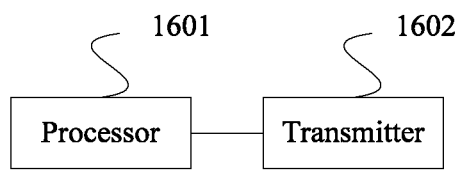
FIG. 16 is a schematic structural diagram of an access network device according to another embodiment of this application.

FIG. 16 is a schematic structural diagram of an access network device according to another embodiment of this application. As shown in FIG. 16, the access network device includes:

a processor 1601, configured to determine information about a carrier corresponding to a terminal device, where the processor 1601 is further configured to determine, based on the information about the carrier, a process quantity corresponding to the carrier; and a transmitter 1602, configured to send, to the terminal device, the process quantity corresponding to the carrier, so that the terminal device transmits data based on the process quantity corresponding to the carrier.

When the data is uplink data, the information about the carrier may include at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, and information about a transmission capability of the terminal device on the carrier.

When the data is downlink data, the information about the carrier may include at least one of the following: a time relationship between downlink scheduling of the terminal device on the carrier and downlink data transmission corresponding to the downlink scheduling, a time relationship between the downlink data transmission of the terminal device on the carrier and sending a feedback message by the terminal device after the terminal device receives the downlink data, time scheduling unit information of the terminal device on the carrier, a subcarrier spacing of the terminal device on the carrier, and information about a transmission capability of the terminal device on the carrier.

The access network device provided in this embodiment of this application can be configured to perform actions or steps performed by the access network device. An implementation principle and a technical effect of the access network device are similar to those of the data transmission method performed by the access network device, and details are not described herein again.

Optionally, the processor 1601 is specifically configured to: when the information about the carrier includes the time relationship between the uplink scheduling on the carrier and the uplink data transmission corresponding to the uplink scheduling, determine a time interval between the uplink scheduling and the uplink data transmission; and determine that the sum of the time interval and a constant M is the process quantity corresponding to the carrier, where M is an integer greater than or equal to 0.

Optionally, the processor 1601 is specifically configured to: when the information about the carrier includes the time relationship between the uplink scheduling on the carrier and the uplink data transmission corresponding to the uplink scheduling, determine a default process quantity corresponding to the carrier, and determine a first time interval between uplink scheduling corresponding to the default process quantity and uplink data transmission corresponding to the default process quantity;

determine a mapping relationship between a time interval and a process quantity based on the default process quantity and the first time interval;

determine a second time interval between the uplink scheduling on the carrier and the uplink data transmission corresponding to the uplink scheduling; and determine, based on the mapping relationship and the second time interval, the process quantity corresponding to the carrier.

Optionally, the processor 1601 is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data;

determine the time sum of the third time interval and the fourth time interval; and determine that the sum of the time sum and a constant N is the process quantity corresponding to the carrier, where N is an integer greater than or equal to 0.

Optionally, the processor 1601 is specifically configured to: when the information about the carrier includes the time relationship between the downlink scheduling on the carrier and the downlink data transmission corresponding to the downlink scheduling and the time relationship between the downlink data transmission and sending a feedback message by the terminal device after the terminal device receives the downlink data, determine a third time interval between the downlink scheduling on the carrier and the downlink data transmission corresponding to the downlink scheduling, and a fourth time interval between the downlink data transmission and sending a feedback message by the terminal device after the terminal device receives the downlink data;

calculate the sum of the third time interval and the fourth time interval, to obtain a first summation result;

determine a default process quantity corresponding to the carrier, and determine a fifth time interval between downlink scheduling corresponding to the default process quantity and downlink data transmission corresponding to the default process quantity, and a sixth time interval between the downlink data transmission corresponding to the default process quantity and sending a feedback message by the terminal device;

calculate the sum of the fifth time interval and the sixth time interval, to obtain a second summation result;

determine a mapping relationship between a summation result and a process quantity based on the default process quantity and the second summation result; and determine, based on the mapping relationship and the first summation result, the process quantity corresponding to the carrier.

Optionally, the processor 1601 is specifically configured to: when the information about the carrier includes the time scheduling unit information on the carrier and/or the subcarrier spacing on the carrier, determine, based on a correspondence between the time scheduling unit information and/or the subcarrier spacing and a process quantity, the process quantity corresponding to the carrier.

The access network device provided in this embodiment of this application can be configured to perform actions or steps performed by the access network device. An implementation principle and a technical effect of the access network device are similar to those of the data transmission method performed by the access network device, and details are not described herein again.

What is claimed is:

1. A data transmission method, comprising:

receiving, by a terminal device from an access network device, information about a carrier of the terminal device;

determining, by the terminal device based on the information about the carrier, a hybrid automatic repeat request (HARQ) process quantity corresponding to the carrier; and transmitting, by the terminal device, data based on the process quantity corresponding to the carrier when the data is uplink data, wherein the information about the carrier comprises at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, or information about a transmission capability of the terminal device on the carrier; or receiving, by the terminal device, data based on the process quantity corresponding to the carrier when the data is downlink data, the information about the carrier comprises at least one of the following: a time relationship between downlink scheduling of the terminal device on the carrier and downlink data reception corresponding to the downlink scheduling, a time relationship between the downlink data reception of the terminal device on the carrier and sending a feedback message by the terminal device after the terminal device receives the downlink data, time scheduling unit information of the terminal device on the carrier, a subcarrier spacing of the terminal device on the carrier, or information about a transmission capability of the terminal device on the carrier, wherein in response to the information about the carrier comprising the time relationship between the uplink scheduling on the carrier and the uplink data transmission corresponding to the uplink scheduling, the determining, by the terminal device based on the information about the carrier, the process quantity corresponding to the carrier comprises:

determining, by the terminal device, a time interval between the uplink scheduling and the uplink data transmission; and determining, by the terminal device, that a sum of the time interval and a constant M is the process quantity corresponding to the carrier, wherein M is an integer greater than or equal to 0.

2. The method according to claim 1, wherein the information about the carrier comprises the time relationship between the uplink scheduling on the carrier and the uplink data transmission corresponding to the uplink scheduling, and wherein the determining, by the terminal device based on the information about the carrier, the process quantity corresponding to the carrier comprises:

determining, by the terminal device, a default process quantity corresponding to the carrier, and determining a first time interval between uplink scheduling corresponding to the default process quantity and uplink data transmission corresponding to the default process quantity;

determining, by the terminal device, a mapping relationship between a time interval and a process quantity based on the default process quantity and the first time interval;

determining, by the terminal device, a second time interval between the uplink scheduling on the carrier and the uplink data transmission corresponding to the uplink scheduling; and determining, by the terminal device based on the mapping relationship and the second time interval, the process quantity corresponding to the carrier.

3. The method according to claim 1, wherein the information about the carrier comprises the time relationship between the downlink scheduling on the carrier and the downlink data transmission corresponding to the downlink scheduling and the time relationship between the downlink data transmission and sending a feedback message by the terminal device after the terminal device receives the downlink data, and wherein the determining, by the terminal device based on the information about the carrier, the process quantity corresponding to the carrier comprises:

determining, by the terminal device, a third time interval between the downlink scheduling on the carrier and the downlink data transmission corresponding to the downlink scheduling, and a fourth time interval between the downlink data transmission and sending a feedback message by the terminal device after the terminal device receives the downlink data;

determining, by the terminal device, a time sum of the third time interval and the fourth time interval; and determining, by the terminal device, that a sum of the time sum and a constant N is the process quantity corresponding to the carrier, wherein N is an integer greater than or equal to 0.

4. The method according to claim 1, wherein the information about the carrier comprises the time relationship between the downlink scheduling on the carrier and the downlink data transmission corresponding to the downlink scheduling and the time relationship between the downlink data transmission and sending a feedback message by the terminal device after the terminal device receives the downlink data, and wherein the determining, by the terminal device based on the information about the carrier, the process quantity corresponding to the carrier comprises:

determining, by the terminal device, a third time interval between the downlink scheduling on the carrier and the downlink data transmission corresponding to the downlink scheduling, and a fourth time interval between the downlink data transmission and sending a feedback message by the terminal device after the terminal device receives the downlink data;

calculating, by the terminal device, a sum of the third time interval and the fourth time interval, to obtain a first summation result;

determining, by the terminal device, a default process quantity corresponding to the carrier, and determining a fifth time interval between downlink scheduling corresponding to the default process quantity and downlink data transmission corresponding to the default process quantity, and a sixth time interval between the downlink data transmission corresponding to the default process quantity and sending a feedback message by the terminal device;

calculating, by the terminal device, a sum of the fifth time interval and the sixth time interval, to obtain a second summation result;

determining, by the terminal device, a mapping relationship between a summation result and a process quantity based on the default process quantity and the second summation result; and determining, by the terminal device based on the mapping relationship and the first summation result, the process quantity corresponding to the carrier.

5. The method according to claim 1, wherein the information about the carrier comprises the time scheduling unit information on the carrier and/or the subcarrier spacing on the carrier, and wherein the determining, by the terminal device based on the information about the carrier, the process quantity corresponding to the carrier comprises:

determining, by the terminal device based on a correspondence between a process quantity and one or more of the time scheduling unit information or the subcarrier spacing, the process quantity corresponding to the carrier.

6. The method according to claim 1, wherein the information about the carrier is carried in any one of the following signaling: higher layer signaling, physical layer signaling, broadcast signaling, or system information block (SIB) signaling.

7. A data transmission method, comprising:

determining, by an access network device, information about a carrier corresponding to a terminal device;

determining, by the access network device based on the information about the carrier, a hybrid automatic repeat request (HARQ) process quantity corresponding to the carrier; and sending, by the access network device to the terminal device, the process quantity corresponding to the carrier, so that the terminal device transmits data based on the process quantity corresponding to the carrier when the data is uplink data, wherein:

the information about the carrier comprises at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, or information about a transmission capability of the terminal device on the carrier; or receiving by the terminal device, data based on the process quantity corresponding to the carrier when the data is downlink data, the information about the carrier comprises at least one of the following: a time relationship between downlink scheduling of the terminal device on the carrier and downlink data reception corresponding to the downlink scheduling, a time relationship between the downlink data reception of the terminal device on the carrier and sending a feedback message by the terminal device after the terminal device receives the downlink data, time scheduling unit information of the terminal device on the carrier; a subcarrier spacing of the terminal device on the carrier, or information about a transmission capability of the terminal device on the carrier;

wherein in response to the information about the carrier comprising the time relationship between the uplink scheduling on the carrier and the uplink data transmission corresponding to the uplink scheduling, the determining, by the access network device based on the information about the carrier, the process quantity corresponding to the carrier comprises:
   determining, by the access network device, a time interval between the uplink scheduling and the uplink data transmission; and
   determining, by the access network device, that a sum of the time interval and a constant M is the process quantity corresponding to the carrier, wherein M is an integer greater than or equal to 0.

8. The method according to claim 7, wherein the information about the carrier comprises the time relationship between the uplink scheduling on the carrier and the uplink data transmission corresponding to the uplink scheduling, and wherein the determining, by the access network device based on the information about the carrier, the process quantity corresponding to the carrier comprises:
   determining, by the access network device, a default process quantity corresponding to the carrier, and determining a first time interval between uplink scheduling corresponding to the default process quantity and uplink data transmission corresponding to the default process quantity;
   determining, by the access network device, a mapping relationship between a time interval and a process quantity based on the default process quantity and the first time interval;
   determining, by the access network device, a second time interval between the uplink scheduling on the carrier and the uplink data transmission corresponding to the uplink scheduling; and
   determining, by the access network device based on the mapping relationship and the second time interval, the process quantity corresponding to the carrier.

9. The method according to claim 7, wherein the information about the carrier comprises the time relationship between the downlink scheduling on the carrier and the downlink data transmission corresponding to the downlink scheduling and the time relationship between the downlink data transmission and sending a feedback message by the terminal device after the terminal device receives the downlink data, and wherein the determining, by the access network device based on the information about the carrier, the process quantity corresponding to the carrier comprises:
   determining, by the access network device, a third time interval between the downlink scheduling on the carrier and the downlink data transmission corresponding to the downlink scheduling, and a fourth time interval between the downlink data transmission and sending a feedback message by the terminal device after the terminal device receives the downlink data;
   determining, by the access network device, a time sum of the third time interval and the fourth time interval; and
   determining, by the access network device, that a sum of the time sum and a constant N is the process quantity corresponding to the carrier, wherein N is an integer greater than or equal to 0.

10. The method according to claim 7, wherein the information about the carrier comprises the time relationship between the downlink scheduling on the carrier and the downlink data transmission corresponding to the downlink scheduling and the time relationship between the downlink data transmission and sending a feedback message by the terminal device after the terminal device receives the downlink data, and wherein the determining, by the access network device based on the information about the carrier, a process quantity corresponding to the carrier comprises:
   determining, by the access network device, a third time interval between the downlink scheduling on the carrier and the downlink data transmission corresponding to the downlink scheduling, and a fourth time interval between the downlink data transmission and sending a feedback message by the terminal device after the terminal device receives the downlink data;
   calculating, by the access network device, a sum of the third time interval and the fourth time interval, to obtain a first summation result;
   determining, by the access network device, a default process quantity corresponding to the carrier, and determining a fifth time interval between downlink scheduling corresponding to the default process quantity and downlink data transmission corresponding to the default process quantity, and a sixth time interval between the downlink data transmission corresponding to the default process quantity and sending a feedback message by the terminal device;
   calculating, by the access network device, a sum of the fifth time interval and the sixth time interval, to obtain a second summation result;
   determining, by the access network device, a mapping relationship between a summation result and a process quantity based on the default process quantity and the second summation result; and
   determining, by the access network device based on the mapping relationship and the first summation result, the process quantity corresponding to the carrier.

11. The method according to claim 7, wherein the information about the carrier comprises the time scheduling unit information on the carrier and/or the subcarrier spacing on the carrier, and wherein the determining, by the access network device based on the information about the carrier, the process quantity corresponding to the carrier comprises:
   determining, by the access network device based on a correspondence between a process quantity and one or more of the time scheduling unit information or the subcarrier spacing, the process quantity corresponding to the carrier.

12. A terminal device, comprising:
   one or more processors; and
   a non-transitory computer-readable storage medium coupled to the one or more processors and storing programming instructions for execution by the processor, wherein the programming instructions instruct the terminal device to:
     receive, from an access network device, information about a carrier of the terminal device;
     determine, based on the information about the carrier, a hybrid automatic repeat request (HARQ) process quantity corresponding to the carrier; and
     transmit data based on the process quantity corresponding to the carrier when the data is uplink data,
   wherein:
   the information about the carrier comprises at least one of the following: a time relationship between uplink scheduling of the terminal device on the carrier and uplink data transmission corresponding to the uplink scheduling, time scheduling unit information of the terminal device on the carrier, a subcarrier spacing of the terminal device on the carrier, or information about a transmission capability of the terminal device on the carrier; or receiving by the terminal device, data based on the process quantity corresponding to the carrier when the data is downlink data, the information about the carrier comprises at least one of the following: a time relationship between downlink scheduling of the terminal device on the carrier and downlink data reception corresponding to the downlink scheduling, a time relationship between the downlink data reception of the terminal device on the carrier and sending a feedback message by the terminal device after the terminal device receives the downlink data, time scheduling unit information of the terminal device on the carrier, a subcarrier spacing of the terminal device on the carrier, or information about a transmission capability of the terminal device on the carrier;

wherein in response to the information about the carrier comprising the time relationship between the uplink scheduling on the carrier and the uplink data transmission corresponding to the uplink scheduling, the programming instructions further instruct the terminal device to:

determine a time interval between the uplink scheduling and the uplink data transmission; and determine that a sum of the time interval and a constant M is the process quantity corresponding to the carrier, wherein M is an integer greater than or equal to 0.

13. The terminal device according to claim 12, wherein the information about the carrier comprises the time relationship between the uplink scheduling on the carrier and the uplink data transmission corresponding to the uplink scheduling, and wherein the programming instructions instruct the terminal device to:

determine a default process quantity corresponding to the carrier, and determine a first time interval between uplink scheduling corresponding to the default process quantity and uplink data transmission corresponding to the default process quantity;

determine a mapping relationship between a time interval and a process quantity based on the default process quantity and the first time interval;

determine a second time interval between the uplink scheduling on the carrier and the uplink data transmission corresponding to the uplink scheduling; and determine, based on the mapping relationship and the second time interval, the process quantity corresponding to the carrier.

14. The terminal device according to claim 12, wherein the information about the carrier comprises the time relationship between the downlink scheduling on the carrier and the downlink data transmission corresponding to the downlink scheduling and the time relationship between the downlink data transmission and sending a feedback message by the terminal device after the terminal device receives the downlink data, and wherein the programming instructions instruct the terminal device to:

determine a third time interval between the downlink scheduling on the carrier and the downlink data transmission corresponding to the downlink scheduling, and a fourth time interval between the downlink data transmission and sending a feedback message by the terminal device after the terminal device receives the downlink data;

determine a time sum of the third time interval and the fourth time interval; and determine that a sum of the time sum and a constant N is the process quantity corresponding to the carrier, wherein N is an integer greater than or equal to 0.

15. The terminal device according to claim 12, wherein the information about the carrier comprises the time relationship between the downlink scheduling on the carrier and the downlink data transmission corresponding to the downlink scheduling and the time relationship between the downlink data transmission and sending a feedback message by the terminal device after the terminal device receives the downlink data, and wherein the programming instructions instruct the terminal device to:

determine a third time interval between the downlink scheduling on the carrier and the downlink data transmission corresponding to the downlink scheduling, and a fourth time interval between the downlink data transmission and sending a feedback message by the terminal device after the terminal device receives the downlink data;

calculate a sum of the third time interval and the fourth time interval, to obtain a first summation result;

determine a default process quantity corresponding to the carrier, and determine a fifth time interval between downlink scheduling corresponding to the default process quantity and downlink data transmission corresponding to the default process quantity, and a sixth time interval between the downlink data transmission corresponding to the default process quantity and sending a feedback message by the terminal device;

calculate a sum of the fifth time interval and the sixth time interval, to obtain a second summation result;

determine a mapping relationship between a summation result and a process quantity based on the default process quantity and the second summation result; and determine, based on the mapping relationship and the first summation result, the process quantity corresponding to the carrier.

16. The terminal device according to claim 12, wherein the information about the carrier comprises the time scheduling unit information on the carrier and/or the subcarrier spacing on the carrier, and wherein the programming instructions instruct the terminal device to:

determine, based on a correspondence between a process quantity and one or more of the time scheduling unit information or the subcarrier spacing, the process quantity corresponding to the carrier.

17. The terminal device according to claim 12, wherein the information about the carrier is carried in any one of the following signaling: higher layer signaling, physical layer signaling, broadcast signaling, or system information block (SIB) signaling.

* * * * *